(12) United States Patent
Pedlow, Jr. et al.

(10) Patent No.: US 7,853,980 B2
(45) Date of Patent: Dec. 14, 2010

(54) BI-DIRECTIONAL INDICES FOR TRICK MODE VIDEO-ON-DEMAND

(75) Inventors: Leo M. Pedlow, Jr., Ramona, CA (US); Davender Agnihotri, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2014 days.

(21) Appl. No.: 10/764,011

(22) Filed: Jan. 23, 2004

(65) Prior Publication Data
US 2005/0097614 A1    May 5, 2005

Related U.S. Application Data

(60) Provisional application No. 60/516,157, filed on Oct. 31, 2003.

(51) Int. Cl.
*H04N 7/173* (2006.01)
(52) U.S. Cl. .......................... 725/88; 725/91
(58) Field of Classification Search .................. 725/90, 725/88, 91
See application file for complete search history.

(56) References Cited

U.S. PATENT DOCUMENTS

| | | |
|---|---|---|
| 3,852,519 A | 12/1974 | Court |
| 4,374,399 A | 2/1983 | Ensinger |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |

(Continued)

FOREIGN PATENT DOCUMENTS

CA    2389247    5/2001

(Continued)

OTHER PUBLICATIONS

"A Report on Security Issues in Multimedia" by Gulwani, pp. 10-14, Apr. 30, 2000, Course Notes, Department of Computer Science and Engineering, Indian Institute of Technology Kanpur.

(Continued)

*Primary Examiner*—Andrew Y Koenig
*Assistant Examiner*—Ricky Chin
(74) *Attorney, Agent, or Firm*—Miller Patent Services; Jerry A. Miller

(57) ABSTRACT

A method of storing digital video content to facilitate trick play consistent with certain embodiments involves storing inter-coded frames of the content in a first file and storing intra-coded frames of the content in a second file. A set of forward indices are used to address the intra coded frames in a forward direction such that playback of the second file in the order of the forward indices simulates a fast-forward playback. A set of reverse indices are used to address the intra-coded frames in a reverse direction such that playback of the second file in the order of the reverse indices simulates a fast-reverse playback. This abstract is not to be considered limiting, since other embodiments may deviate from the features described in this abstract.

28 Claims, 10 Drawing Sheets

U.S. PATENT DOCUMENTS

| | | |
|---|---|---|
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,881,263 A | 11/1989 | Herbison et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,159,633 A | 10/1992 | Nakamura |
| 5,195,135 A | 3/1993 | Palmer |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,515,107 A | 5/1996 | Chiang et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A * | 5/1997 | Carrubba et al. ............ 348/563 |
| 5,629,981 A | 5/1997 | Nerlikar |
| 5,652,615 A | 7/1997 | Bryant et al. |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,835,668 A | 11/1998 | Yanagihara |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,892,900 A | 4/1999 | Ginter et al. |
| 5,894,320 A | 4/1999 | Vancelette |
| 5,894,516 A | 4/1999 | Brandenburg |
| 5,905,732 A | 5/1999 | Fimoff et al. |
| 5,915,018 A | 6/1999 | Aucsmith |
| 5,917,830 A | 6/1999 | Chen et al. |
| 5,920,625 A | 7/1999 | Davies |
| 5,920,626 A | 7/1999 | Durden et al. |
| 5,922,048 A | 7/1999 | Emura |
| 5,923,755 A | 7/1999 | Birch et al. |
| 5,930,361 A | 7/1999 | Hayashi et al. |

| | | | | | | |
|---|---|---|---|---|---|---|
| 5,933,500 | A | 8/1999 | Blatter et al. | 6,266,416 B1 | 7/2001 | Sigbjornsen et al. |
| 5,940,738 | A | 8/1999 | Rao | 6,266,480 B1 | 7/2001 | Ezaki et al. |
| 5,943,605 | A | 8/1999 | Koepele, Jr. | 6,272,538 B1 | 8/2001 | Holden et al. |
| 5,949,877 | A | 9/1999 | Traw et al. | 6,278,783 B1 | 8/2001 | Kocher et al. |
| 5,949,881 | A | 9/1999 | Davis | 6,289,455 B1 | 9/2001 | Kocher et al. |
| 5,963,909 | A | 10/1999 | Warren et al. | 6,292,568 B1 | 9/2001 | Akins, III et al. |
| 5,973,679 | A | 10/1999 | Abbott et al. | 6,292,892 B1 | 9/2001 | Davis |
| 5,973,722 | A | 10/1999 | Wakai et al. | 6,307,939 B1 | 10/2001 | Vigarie |
| 5,973,726 | A | 10/1999 | Iijima et al. | 6,311,012 B1 | 10/2001 | Cho et al. |
| 5,999,622 | A | 12/1999 | Yasukawa et al. | 6,314,111 B1 | 11/2001 | Nandikonda et al. |
| 5,999,698 | A | 12/1999 | Nakai et al. | 6,314,409 B2 | 11/2001 | Schneck et al. |
| 6,005,561 | A | 12/1999 | Hawkins et al. | 6,323,914 B1 | 11/2001 | Linzer |
| 6,005,940 | A | 12/1999 | Kulinets | 6,324,288 B1 | 11/2001 | Hoffman |
| 6,011,849 | A | 1/2000 | Orrin | 6,327,421 B1 * | 12/2001 | Tiwari et al. ................... 386/68 |
| 6,012,144 | A | 1/2000 | Pickett | 6,337,947 B1 | 1/2002 | Porter et al. |
| 6,016,348 | A | 1/2000 | Blatter et al. | 6,351,538 B1 | 2/2002 | Uz |
| 6,021,199 | A | 2/2000 | Ishibashi | 6,351,813 B1 | 2/2002 | Mooney et al. |
| 6,021,201 | A | 2/2000 | Bakhle et al. | 6,377,589 B1 | 4/2002 | Knight et al. |
| 6,026,164 | A | 2/2000 | Sakamoto et al. | 6,378,130 B1 | 4/2002 | Adams |
| 6,028,932 | A | 2/2000 | Park | 6,389,533 B1 | 5/2002 | Davis et al. |
| 6,049,613 | A | 4/2000 | Jakobsson | 6,389,537 B1 | 5/2002 | Davis et al. |
| 6,055,314 | A | 4/2000 | Spies et al. | 6,415,031 B1 | 7/2002 | Colligan et al. |
| 6,055,315 | A | 4/2000 | Doyle et al. | 6,415,101 B1 | 7/2002 | deCarmo et al. |
| 6,057,832 | A * | 5/2000 | Lev et al. ................... 715/720 | 6,418,169 B1 | 7/2002 | Datari |
| 6,057,872 | A | 5/2000 | Candelore | 6,424,717 B1 | 7/2002 | Pinder et al. |
| 6,058,186 | A | 5/2000 | Enari | 6,430,361 B2 | 8/2002 | Lee |
| 6,058,192 | A | 5/2000 | Guralnick et al. | 6,445,738 B1 * | 9/2002 | Zdepski et al. ......... 375/240.01 |
| 6,061,451 | A | 5/2000 | Muratani et al. | 6,449,718 B1 | 9/2002 | Rucklidge et al. |
| 6,061,471 | A | 5/2000 | Coleman | 6,452,923 B1 | 9/2002 | Gerszberg et al. |
| 6,064,676 | A | 5/2000 | Slattery et al. | 6,453,115 B1 * | 9/2002 | Boyle .......................... 386/68 |
| 6,064,748 | A | 5/2000 | Hogan | 6,453,116 B1 | 9/2002 | Ando et al. |
| 6,065,050 | A | 5/2000 | DeMoney | 6,456,985 B1 | 9/2002 | Ohtsuka |
| 6,069,647 | A | 5/2000 | Sullivan et al. | 6,459,427 B1 | 10/2002 | Mao et al. |
| 6,070,245 | A | 5/2000 | Murphy, Jr. et al. | 6,463,152 B1 | 10/2002 | Takahashi |
| 6,072,872 | A | 6/2000 | Chang et al. | 6,466,671 B1 | 10/2002 | Maillard et al. |
| 6,072,873 | A | 6/2000 | Bewick | 6,473,459 B1 | 10/2002 | Sugano et al. |
| 6,073,122 | A | 6/2000 | Wool | 6,480,551 B1 | 11/2002 | Ohishi et al. |
| 6,088,450 | A | 7/2000 | Davis et al. | 6,490,728 B1 | 12/2002 | Kitazato et al. |
| 6,105,134 | A | 8/2000 | Pinder et al. | 6,505,032 B1 | 1/2003 | McCorkle et al. |
| 6,108,422 | A | 8/2000 | Newby et al. | 6,505,299 B1 | 1/2003 | Zeng et al. |
| 6,115,821 | A | 9/2000 | Newby et al. | 6,510,554 B1 | 1/2003 | Gorden et al. |
| 6,118,873 | A | 9/2000 | Lotspiech et al. | 6,519,693 B1 | 2/2003 | Debey |
| 6,134,237 | A | 10/2000 | Brailean et al. | 6,526,144 B2 | 2/2003 | Markandey et al. |
| 6,134,551 | A | 10/2000 | Aucsmith | 6,529,526 B1 | 3/2003 | Schneidewend |
| 6,138,237 | A | 10/2000 | Ruben et al. | 6,543,053 B1 | 4/2003 | Li et al. |
| 6,148,082 | A | 11/2000 | Slattery et al. | 6,549,229 B1 | 4/2003 | Kirby et al. |
| 6,154,206 | A | 11/2000 | Ludtke | 6,550,008 B1 | 4/2003 | Zhang et al. |
| 6,157,719 | A | 12/2000 | Wasilewski et al. | 6,557,031 B1 | 4/2003 | Mimura et al. |
| 6,170,075 | B1 | 1/2001 | Schuster et al. | 6,587,561 B1 | 7/2003 | Sered et al. |
| 6,181,334 | B1 | 1/2001 | Freeman et al. | 6,590,979 B1 | 7/2003 | Ryan |
| 6,181,364 | B1 | 1/2001 | Ford | 6,621,866 B1 | 9/2003 | Florencio et al. |
| 6,185,369 | B1 | 2/2001 | Ko et al. | 6,621,979 B1 | 9/2003 | Eerenberg et al. |
| 6,185,546 | B1 | 2/2001 | Davis | 6,640,145 B2 | 10/2003 | Hoffberg et al. |
| 6,189,096 | B1 | 2/2001 | Haverty | 6,640,305 B2 | 10/2003 | Kocher et al. |
| 6,192,131 | B1 | 2/2001 | Geer et al. | 6,643,298 B1 | 11/2003 | Brunheroto et al. |
| 6,199,053 | B1 | 3/2001 | Herbert et al. | 6,650,754 B2 | 11/2003 | Akiyama et al. |
| 6,201,927 | B1 * | 3/2001 | Comer ........................ 386/68 | 6,654,389 B1 | 11/2003 | Brunheroto et al. |
| 6,204,843 | B1 | 3/2001 | Freeman et al. | 6,678,740 B1 | 1/2004 | Rakib et al. |
| 6,209,098 | B1 | 3/2001 | Davis | 6,681,326 B2 | 1/2004 | Son et al. |
| 6,215,484 | B1 | 4/2001 | Freeman et al. | 6,684,250 B2 | 1/2004 | Anderson et al. |
| 6,219,358 | B1 | 4/2001 | Pinder et al. | 6,697,489 B1 | 2/2004 | Candelore |
| 6,222,924 | B1 | 4/2001 | Salomaki | 6,697,944 B1 | 2/2004 | Jones et al. |
| 6,223,290 | B1 | 4/2001 | Larsen et al. | 6,701,258 B2 | 3/2004 | Kramb et al. |
| 6,226,385 | B1 | 5/2001 | Taguchi et al. | 6,704,733 B2 | 3/2004 | Clark et al. |
| 6,226,618 | B1 | 5/2001 | Downs | 6,707,696 B1 | 3/2004 | Turner et al. |
| 6,229,895 | B1 | 5/2001 | Son et al. | 6,714,650 B1 | 3/2004 | Maillard et al. |
| 6,230,194 | B1 | 5/2001 | Frailong et al. | 6,741,795 B1 | 5/2004 | Takehiko et al. |
| 6,230,266 | B1 | 5/2001 | Perlman et al. | 6,754,276 B1 | 6/2004 | Harumoto et al. |
| 6,236,727 | B1 | 5/2001 | Ciacelli et al. | 6,772,340 B1 | 8/2004 | Peinado et al. |
| 6,240,553 | B1 | 5/2001 | Son et al. | 6,788,690 B2 | 9/2004 | Harri |
| 6,246,720 | B1 | 6/2001 | Kutner et al. | 6,788,882 B1 | 9/2004 | Geer et al. |
| 6,256,747 | B1 | 7/2001 | Inohara et al. | 6,826,185 B1 | 11/2004 | Montanaro et al. |
| 6,263,506 | B1 | 7/2001 | Ezaki et al. | 6,853,728 B1 | 2/2005 | Kahn et al. |

| | | | |
|---|---|---|---|
| 6,883,050 B1 | 4/2005 | Safadi | |
| 6,891,565 B1 | 5/2005 | Dietrich | |
| 6,895,128 B2 | 5/2005 | Bohnenkamp | |
| 6,904,520 B1 | 6/2005 | Rosset et al. | |
| 6,917,684 B1 | 7/2005 | Tatebayashi et al. | |
| 6,925,180 B2* | 8/2005 | Iwamura | 380/37 |
| 6,938,162 B1 | 8/2005 | Nagai et al. | |
| 6,965,724 B1* | 11/2005 | Boccon-Gibod et al. | 386/68 |
| 6,976,166 B2 | 12/2005 | Herley et al. | |
| 6,988,238 B1 | 1/2006 | Kovacevic et al. | |
| 7,023,924 B1* | 4/2006 | Keller et al. | 375/240.26 |
| 7,039,802 B1 | 5/2006 | Eskicioglu et al. | |
| 7,039,938 B2 | 5/2006 | Candelore | |
| 7,055,166 B1 | 5/2006 | Logan et al. | |
| 7,065,213 B2 | 6/2006 | Pinder | |
| 7,079,752 B1 | 7/2006 | Leyendecker | |
| 7,089,579 B1 | 8/2006 | Mao et al. | |
| 7,096,481 B1 | 8/2006 | Forecast et al. | |
| 7,096,487 B1* | 8/2006 | Gordon et al. | 725/91 |
| 7,110,659 B2 | 9/2006 | Fujie et al. | |
| 7,120,250 B2 | 10/2006 | Candelore | |
| 7,124,303 B2 | 10/2006 | Candelore | |
| 7,127,619 B2 | 10/2006 | Unger et al. | |
| 7,139,398 B2 | 11/2006 | Candelore et al. | |
| 7,146,007 B1 | 12/2006 | Maruo et al. | |
| 7,151,831 B2 | 12/2006 | Candelore et al. | |
| 7,151,833 B2 | 12/2006 | Candelore et al. | |
| 7,155,012 B2 | 12/2006 | Candelore et al. | |
| 7,158,185 B2 | 1/2007 | Gastaldi | |
| 7,194,758 B1 | 3/2007 | Waki et al. | |
| 7,221,706 B2 | 5/2007 | Zhao et al. | |
| 7,292,692 B2 | 11/2007 | Bonan et al. | |
| 7,298,959 B1 | 11/2007 | Hallberg et al. | |
| 7,336,785 B1 | 2/2008 | Lu et al. | |
| 7,391,866 B2 | 6/2008 | Fukami et al. | |
| 7,490,236 B2 | 2/2009 | Wasilewski | |
| 7,496,198 B2 | 2/2009 | Pinder et al. | |
| 7,508,454 B1 | 3/2009 | Vantalon et al. | |
| 7,555,123 B2 | 6/2009 | Pinder et al. | |
| 2001/0013123 A1 | 8/2001 | Freeman et al. | |
| 2001/0024471 A1 | 9/2001 | Bordes et al. | |
| 2001/0030959 A1 | 10/2001 | Ozawa et al. | |
| 2001/0036271 A1 | 11/2001 | Javed | |
| 2001/0051007 A1 | 12/2001 | Teshima | |
| 2002/0003881 A1 | 1/2002 | Reitmeier et al. | |
| 2002/0021805 A1 | 2/2002 | Schumann et al. | |
| 2002/0023013 A1 | 2/2002 | Hughes et al. | |
| 2002/0026478 A1 | 2/2002 | Rodgers et al. | |
| 2002/0026587 A1 | 2/2002 | Talstra et al. | |
| 2002/0036717 A1 | 3/2002 | Abiko et al. | |
| 2002/0044558 A1 | 4/2002 | Gobbi et al. | |
| 2002/0046406 A1 | 4/2002 | Chelehmal et al. | |
| 2002/0047915 A1 | 4/2002 | Misu | |
| 2002/0056093 A1 | 5/2002 | Kunkel et al. | |
| 2002/0059425 A1 | 5/2002 | Belfiore et al. | |
| 2002/0065678 A1 | 5/2002 | Peliotis et al. | |
| 2002/0066101 A1 | 5/2002 | Gordon et al. | |
| 2002/0067436 A1 | 6/2002 | Shirahama et al. | |
| 2002/0083317 A1 | 6/2002 | Ohta et al. | |
| 2002/0083438 A1 | 6/2002 | So et al. | |
| 2002/0083439 A1 | 6/2002 | Eldering | |
| 2002/0097322 A1 | 7/2002 | Monroe et al. | |
| 2002/0100054 A1 | 7/2002 | Feinberg et al. | |
| 2002/0108035 A1 | 8/2002 | Herley et al. | |
| 2002/0109707 A1 | 8/2002 | Lao et al. | |
| 2002/0116705 A1 | 8/2002 | Perlman et al. | |
| 2002/0126890 A1 | 9/2002 | Katayama et al. | |
| 2002/0129243 A1 | 9/2002 | Nanjundiah | |
| 2002/0144116 A1 | 10/2002 | Giobbi | |
| 2002/0144260 A1 | 10/2002 | Devara | |
| 2002/0150239 A1 | 10/2002 | Carny et al. | |
| 2002/0157115 A1 | 10/2002 | Lu | |
| 2002/0157116 A1 | 10/2002 | Jasinschi | |
| 2002/0164022 A1 | 11/2002 | Strasser et al. | |
| 2002/0170053 A1 | 11/2002 | Peterka et al. | |
| 2002/0184506 A1 | 12/2002 | Perlman | |
| 2002/0194589 A1 | 12/2002 | Cristofalo et al. | |
| 2002/0194613 A1 | 12/2002 | Unger | |
| 2002/0196939 A1 | 12/2002 | Unger et al. | |
| 2003/0002854 A1 | 1/2003 | Belknap et al. | |
| 2003/0009669 A1 | 1/2003 | White et al. | |
| 2003/0012286 A1 | 1/2003 | Ishtiaq et al. | |
| 2003/0021412 A1 | 1/2003 | Candelore et al. | |
| 2003/0026423 A1* | 2/2003 | Unger et al. | 380/217 |
| 2003/0026523 A1 | 2/2003 | Chua et al. | |
| 2003/0028879 A1 | 2/2003 | Gordon et al. | |
| 2003/0034997 A1 | 2/2003 | McKain et al. | |
| 2003/0035482 A1 | 2/2003 | Klompenhouwer et al. | |
| 2003/0035540 A1 | 2/2003 | Freeman et al. | |
| 2003/0035543 A1 | 2/2003 | Gillon | |
| 2003/0046686 A1 | 3/2003 | Candelore et al. | |
| 2003/0046687 A1 | 3/2003 | Hodges et al. | |
| 2003/0059047 A1 | 3/2003 | Iwamura | |
| 2003/0063615 A1 | 4/2003 | Luoma et al. | |
| 2003/0072555 A1 | 4/2003 | Yap et al. | |
| 2003/0077071 A1 | 4/2003 | Lin et al. | |
| 2003/0081630 A1 | 5/2003 | Mowery et al. | |
| 2003/0081776 A1 | 5/2003 | Candelore | |
| 2003/0084284 A1 | 5/2003 | Ando et al. | |
| 2003/0097662 A1 | 5/2003 | Russ et al. | |
| 2003/0108199 A1 | 6/2003 | Pinder et al. | |
| 2003/0112333 A1 | 6/2003 | Chen et al. | |
| 2003/0118243 A1* | 6/2003 | Sezer et al. | 382/245 |
| 2003/0123664 A1 | 7/2003 | Pedlow et al. | |
| 2003/0123849 A1 | 7/2003 | Nallur et al. | |
| 2003/0126086 A1 | 7/2003 | Safadi | |
| 2003/0133570 A1 | 7/2003 | Candelore et al. | |
| 2003/0140257 A1 | 7/2003 | Peterka et al. | |
| 2003/0145329 A1 | 7/2003 | Candelore | |
| 2003/0152224 A1 | 8/2003 | Candelore et al. | |
| 2003/0152226 A1 | 8/2003 | Candelore et al. | |
| 2003/0152232 A1 | 8/2003 | Pirila et al. | |
| 2003/0156718 A1 | 8/2003 | Candelore et al. | |
| 2003/0159139 A1 | 8/2003 | Candelore et al. | |
| 2003/0159140 A1 | 8/2003 | Candelore | |
| 2003/0159152 A1 | 8/2003 | Lin et al. | |
| 2003/0174837 A1 | 9/2003 | Candelore et al. | |
| 2003/0174844 A1 | 9/2003 | Candelore | |
| 2003/0188154 A1 | 10/2003 | Dallard | |
| 2003/0188164 A1 | 10/2003 | Okimoto et al. | |
| 2003/0190054 A1 | 10/2003 | Troyansky et al. | |
| 2003/0193973 A1 | 10/2003 | Takashimizu et al. | |
| 2003/0198223 A1 | 10/2003 | Mack et al. | |
| 2003/0204717 A1 | 10/2003 | Kuehnel | |
| 2003/0222994 A1 | 12/2003 | Dawson | |
| 2003/0226149 A1 | 12/2003 | Chun et al. | |
| 2003/0228018 A1* | 12/2003 | Vince | 380/277 |
| 2004/0003008 A1 | 1/2004 | Wasilewski et al. | |
| 2004/0010717 A1 | 1/2004 | Simec et al. | |
| 2004/0021764 A1 | 2/2004 | Driscoll, Jr. et al. | |
| 2004/0028227 A1 | 2/2004 | Yu | |
| 2004/0037421 A1 | 2/2004 | Truman | |
| 2004/0047470 A1 | 3/2004 | Candelore | |
| 2004/0049688 A1 | 3/2004 | Candelore et al. | |
| 2004/0049690 A1 | 3/2004 | Candelore et al. | |
| 2004/0049691 A1 | 3/2004 | Candelore et al. | |
| 2004/0049694 A1 | 3/2004 | Candelore | |
| 2004/0064688 A1 | 4/2004 | Jacobs | |
| 2004/0068659 A1 | 4/2004 | Diehl | |
| 2004/0073917 A1 | 4/2004 | Pedlow, Jr. et al. | |
| 2004/0078575 A1 | 4/2004 | Morten et al. | |
| 2004/0081333 A1 | 4/2004 | Grab et al. | |
| 2004/0083117 A1 | 4/2004 | Kim et al. | |
| 2004/0086127 A1 | 5/2004 | Candelore | |
| 2004/0088552 A1 | 5/2004 | Candelore | |
| 2004/0088558 A1 | 5/2004 | Candelore | |

| | | | |
|---|---|---|---|
| 2004/0091109 A1 | 5/2004 | Son et al. | |
| 2004/0100510 A1 | 5/2004 | Milic-Frayling et al. | |
| 2004/0123094 A1 | 6/2004 | Sprunk | |
| 2004/0136532 A1 | 7/2004 | Pinder et al. | |
| 2004/0139337 A1 | 7/2004 | Pinder et al. | |
| 2004/0141314 A1 | 7/2004 | Vautrin et al. | |
| 2004/0158721 A1 | 8/2004 | Candelore | |
| 2004/0165586 A1 | 8/2004 | Read et al. | |
| 2004/0168121 A1 | 8/2004 | Matz | |
| 2004/0172650 A1 | 9/2004 | Hawkins et al. | |
| 2004/0181666 A1 | 9/2004 | Candelore | |
| 2004/0187161 A1 | 9/2004 | Cao | |
| 2004/0193550 A1 | 9/2004 | Siegal | |
| 2004/0240668 A1 | 12/2004 | Bonan et al. | |
| 2004/0247122 A1 | 12/2004 | Hobrock et al. | |
| 2004/0261099 A1 | 12/2004 | Durden et al. | |
| 2004/0264924 A1* | 12/2004 | Campisano et al. | 386/68 |
| 2004/0267602 A1 | 12/2004 | Gaydos et al. | |
| 2005/0004875 A1 | 1/2005 | Kontio et al. | |
| 2005/0015816 A1 | 1/2005 | Christofalo et al. | |
| 2005/0028193 A1 | 2/2005 | Candelore et al. | |
| 2005/0036067 A1 | 2/2005 | Ryal et al. | |
| 2005/0063541 A1 | 3/2005 | Candelore | |
| 2005/0066357 A1 | 3/2005 | Ryal | |
| 2005/0071669 A1 | 3/2005 | Medvinsky et al. | |
| 2005/0094808 A1 | 5/2005 | Pedlow, Jr. et al. | |
| 2005/0094809 A1 | 5/2005 | Pedlow, Jr. et al. | |
| 2005/0097596 A1 | 5/2005 | Pedlow, Jr. | |
| 2005/0097597 A1 | 5/2005 | Pedlow, Jr. et al. | |
| 2005/0097598 A1 | 5/2005 | Pedlow, Jr. et al. | |
| 2005/0097614 A1 | 5/2005 | Pedlow, Jr. et al. | |
| 2005/0102702 A1 | 5/2005 | Candelore et al. | |
| 2005/0129233 A1 | 6/2005 | Pedlow, Jr. | |
| 2005/0141713 A1 | 6/2005 | Genevois | |
| 2005/0169473 A1 | 8/2005 | Candelore | |
| 2005/0192904 A1 | 9/2005 | Candelore | |
| 2005/0198586 A1 | 9/2005 | Sekiguchi et al. | |
| 2005/0259813 A1 | 11/2005 | Wasilewski et al. | |
| 2005/0265547 A1 | 12/2005 | Strasser et al. | |
| 2005/0283797 A1 | 12/2005 | Eldering et al. | |
| 2006/0029372 A1* | 2/2006 | Barrett et al. | 386/111 |
| 2006/0115083 A1 | 6/2006 | Candelore et al. | |
| 2006/0130119 A1 | 6/2006 | Candelore et al. | |
| 2006/0130121 A1 | 6/2006 | Candelore et al. | |
| 2006/0136976 A1 | 6/2006 | Coupe et al. | |
| 2006/0153379 A1 | 7/2006 | Candelore et al. | |
| 2006/0168616 A1 | 7/2006 | Candelore | |
| 2006/0174264 A1 | 8/2006 | Candelore | |
| 2006/0262926 A1 | 11/2006 | Candelore et al. | |
| 2006/0269060 A1 | 11/2006 | Candelore et al. | |
| 2007/0006253 A1 | 1/2007 | Pinder et al. | |
| 2007/0091886 A1 | 4/2007 | Davis et al. | |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 696 141 | 7/1995 |
| EP | 0674440 | 9/1995 |
| EP | 0674441 | 9/1995 |
| EP | 0720374 | 7/1996 |
| EP | 0382764 | 4/1997 |
| EP | 0833517 | 4/1998 |
| EP | 0866615 | 9/1998 |
| EP | 0 926 894 | 6/1999 |
| EP | 1187483 | 3/2002 |
| JP | 61-264371 | 11/1986 |
| JP | 07-046575 | 2/1995 |
| JP | 7067028 | 3/1995 |
| JP | 10-336624 | 12/1998 |
| JP | 2001-69480 | 3/2001 |
| JP | 11243534 | 10/2002 |
| KR | 299634 | 8/2008 |
| WO | WO 86/07224 | 12/1986 |
| WO | WO 93/09525 | 5/1993 |
| WO | WO 94/10775 | 5/1994 |
| WO | WO 94/13081 | 6/1994 |
| WO | WO 94/13107 | 6/1994 |
| WO | WO 95/28058 | 4/1995 |
| WO | WO 97/38530 | 10/1997 |
| WO | WO 97/46009 | 12/1997 |
| WO | WO 98/08341 | 2/1998 |
| WO | WO 00/31964 | 6/2000 |
| WO | WO 00/59203 | 10/2000 |
| WO | WO 00/60846 | 10/2000 |
| WO | WO 00/64164 | 10/2000 |
| WO | WO 00/70817 | 11/2000 |
| WO | WO 01/26372 | 4/2001 |
| WO | WO 01/35669 | 5/2001 |
| WO | WO 01/65762 | 9/2001 |
| WO | WO 01/67667 | 9/2001 |
| WO | WO 01/78386 | 10/2001 |
| WO | WO 02/51096 | 6/2002 |

OTHER PUBLICATIONS

"Ad Agencies and Advertisers To Be Empowered with Targeted Ads Delivered by Television's Prevailing Video Servers" Article Business Section of The New York Times, Updated Thursday, Dec. 20, 2001.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, In Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet publication from www.metrolink.com, undated.

"Multimedia and Security Workshop at ACM Multimedia '98. Bristol, U.K., Sep. 1998.

"Passage™, Freedom to Choose", 2003, Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001.

Anonymous, Message Authentication with Partial Encryption, Research discosure RD 296086, Dec. 10, 1998.

McCormac Hack Over Cablemodem, HackWatchAug. 10, 1998.

Anonymous, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"How Networks Work—Milennium Edition"—pp. 88-89, Que Corporation, 2000.

Liu, et al. Motion Vector Encryption in Multimedia Streaming, 2004, IEEE, pp. 64-71.

U.S. Appl. No. 10/634,546, issued date Oct. 2001, Microsoft Screen Shots and Help Files, Microsoft Windows XP.

U.S. Appl. No. 10/667,614, issued date 2001, MPEG-2 Digital Broadcast Pocket Guide vol. 6, Acterna, LLC.

Microsoft Windows XP, Oct. 2001, Microsoft, Screen Shots and Help Files.

MPEG-2 Digital Broadcast Pocket Guide vol. 6, Copyright 201 Acterna, LLC.

"MPEG-2 Transmission," Dr. Gorry Fairhurst, Jan. 2001.

"MPEG-2 Compliant Trick Play Over a Digital Interface," van Gassel et al., IEEE pp. 170-171., 2002.

"How Networks Work" Derfler and Freed, Ziff-Davis Press, 1996.

"How Computers Work—Millennium Edition," Ron White, Que Corporation, 1999.

"How The Internet Works—Millennium Edition," Preston Gralla, Que Corporation, 1999.

"Desktop Encyclopedia of the Internet," Nathan J. Muller, Artech House, 1999.

"K-Time Encryption for K-Time Licensing," Perkins, et al., IEEE, 2002.

"Partial Encryption of Compressed Images and Videos," Howard Cheng et al. IEEE 2000.

"Secure Transmission of MPEG Video Sources," Teixeira et al., date unknown.

"DVB Conditional Access," David Cutts, Electronics and Communication Engineering Journal, Feb. 1997.

Anonymous—Functional Model of a Condtional Access System; EBU Project Group B/CA, EBU Review Technical, Winter No. 266, Grand-Saconnex, CH; pp. 64-77; 1995.

Perry et al, "Final Report of the Co-Chairs of the Broadcast Protection Discussion Subgroup to the Copy Protection Technical Working Group," Jun. 3, 2003.

Anonymous, Rehabilitation of Digital Television, CEATEC Japan 2003, Special Report, Jan. 2003. (*Translation provided by Japanese associate*).

Teixeira et al., Secure Transmission of MPEG Video Sources, Nov. 6, 1998 (*Resubmitted with date provided by Wayback machine.*).

U.S. Appl. No. 10/038,217, filed Jan. 2, 2002, Critical Packet Partial Encryption.

U.S. Appl. No. 10/038,032, filed Jan. 2, 2002, Time Division Partial Encryption.

U.S. Appl. No. 10/037,914, filed Jan. 2, 2002, Elementary Stream Partial Encryption.

U.S. Appl. No. 10/037,499, filed Jan. 2, 2002, Partial Encryption and PID Mapping.

U.S. Appl. No. 10/037,498, filed Jan. 2, 2002, Decoding and Decryption of Partially Encrypted Information.

U.S. Appl. No. 10/273,905, filed Oct. 18, 2002, Video Slice and Active Region Based Dual Partial Encryption.

U.S. Appl. No. 10/319,133, filed Dec. 13, 2002, Selective Encryption for Video on Demand.

U.S. Appl. No. 10/273,875, filed Oct. 18, 2002, Encryption and Content Control in a Digital Broadcast System.

U.S. Appl. No. 10/084,106, filed Feb. 27, 2002, Reconstitution of Program Streams Split Across Multiple Program Identifiers.

U.S. Appl. No. 10/273,903, filed Oct. 18, 2002, Star Pattern Partial Encryption.

U.S. Appl. No. 10/274,084, filed Oct. 18, 2002, Slice Mask and Moat Pattern Partial Encryption.

U.S. Appl. No. 10/319,066, filed Dec. 13, 2002, Content Replacement by PID Mapping.

U.S. Appl. No. 10/293,761, filed Nov. 13, 2002, Upgrading of Encryption.

U.S. Appl. No. 10/318,782, filed Dec. 13, 2002, Content Distribution for Multiple Digital Rights Management.

U.S. Appl. No. 10/319,169, filed Dec. 13, 2002, Selective Encryption to Enable Multiple Decryption Keys.

U.S. Appl. No. 10/273,904, filed Oct. 18, 2002, Multiple Partial Encryption Using Retuning.

U.S. Appl. No. 10/319,096, filed Dec. 13, 2002, Selective Encryption to Enable Trick Play, Abandoned.

U.S. Appl. No. 10/391,940, filed Mar. 19, 2003, Selective Encryption to Enable Trick Play.

U.S. Appl. No. 10/303,594, filed Nov. 25, 2002, Progressive Video Refresh Slice Detection.

U.S. Appl. No. 10/274,019, filed Oct. 18, 2002, Video Scene Change Detection.

U.S. Appl. No. 10/393,324, filed Mar. 20, 2003, Auxiliary Program Association Table.

U.S. Appl. No. 10/373,479, filed Feb. 24, 2003, PID Filter Based Network Routing.
U.S. Appl. No. 10/767,421, filed Jan. 29, 2004, Content Scrambling With Minimal Impact on Legacy Devices.
U.S. Appl. No. 10/662,585, filed Sep. 15, 2003, Decryption System.
U.S. Appl. No. 10/667,614, filed Sep. 22, 2003, Modifying Content Rating.
U.S. Appl. No. 10/634,546, filed Aug. 5, 2003, Variable Perspective View of Video Images.
U.S. Appl. No. 10/822,891, filed Apr. 13, 2004, Macro-Block Based Content Replacement by PID Mapping.
U.S. Appl. No. 10/764,202, filed Jan. 23, 2004, Re-Encrypted Delivery of Video On Demand Content.
U.S. Appl. No. 10/828,737, filed Apr. 21, 2004, Batch Mode Session-based Encryption of Video on Demand Content.
U.S. Appl. No. 10/764,011, filed Jan. 23, 2004, Bi-Directional Indices for Trick Mode Video-on-Demand.
U.S. Appl. No. 10/802,084, filed Mar. 16, 2004, Hybrid Storage of Video on Demand Content.
U.S. Appl. No. 10/802,007, filed Mar. 16, 2004, Dynamic Composition of Pre-Encrypted Video on Demand Content.
U.S. Appl. No. 10/774,871, filed Feb. 9, 2004, Cablecard with Content Manipulation.
U.S. Appl. No. 10/802,008, filed Mar. 16, 2004, Preparation of Content for Multiple Conditional Access Methods in Video on Demand.
U.S. Appl. No. 10/823,431, filed Apr. 13, 2004, Composite Session-Based Encryption of Video on Demand.
U.S. Appl. No. 10/964,267, filed Oct. 13, 2004, Multiple Selective Encryption with DRM.
U.S. Appl. No. 10/763,865, filed Jan. 22, 2004, Method And Apparatus For Securing Control Words.
U.S. Appl. No. 10/387,163, filed Mar. 22, 2003, Method and Apparatus for Protecting the Transfer of Data.
U.S. Appl. No. 10/815,371, filed Mar. 31, 2004, IP Delivery of Secure Digital Content.
U.S. Appl. No. 10/764,682, filed Jan. 23, 2004, System, Method and Apparatus for Secure Digital Content Transmission.
U.S. Appl. No. 10/388,002, filed Mar. 12, 2003, Mechanism for Protecting the Transfer of Digital Content.
U.S. Appl. No. 10/690,192, filed Mar. 12, 2003, Descrambler.
U.S. Appl. No. 10/691,170, filed Oct. 5, 2003, Multi-Process.
U.S. Appl. No. 10/403,834, filed Mar. 31, 2003, System and Method for Partially Encrypted Multimedia System.

* cited by examiner

FIG. 1  *Prior Art*

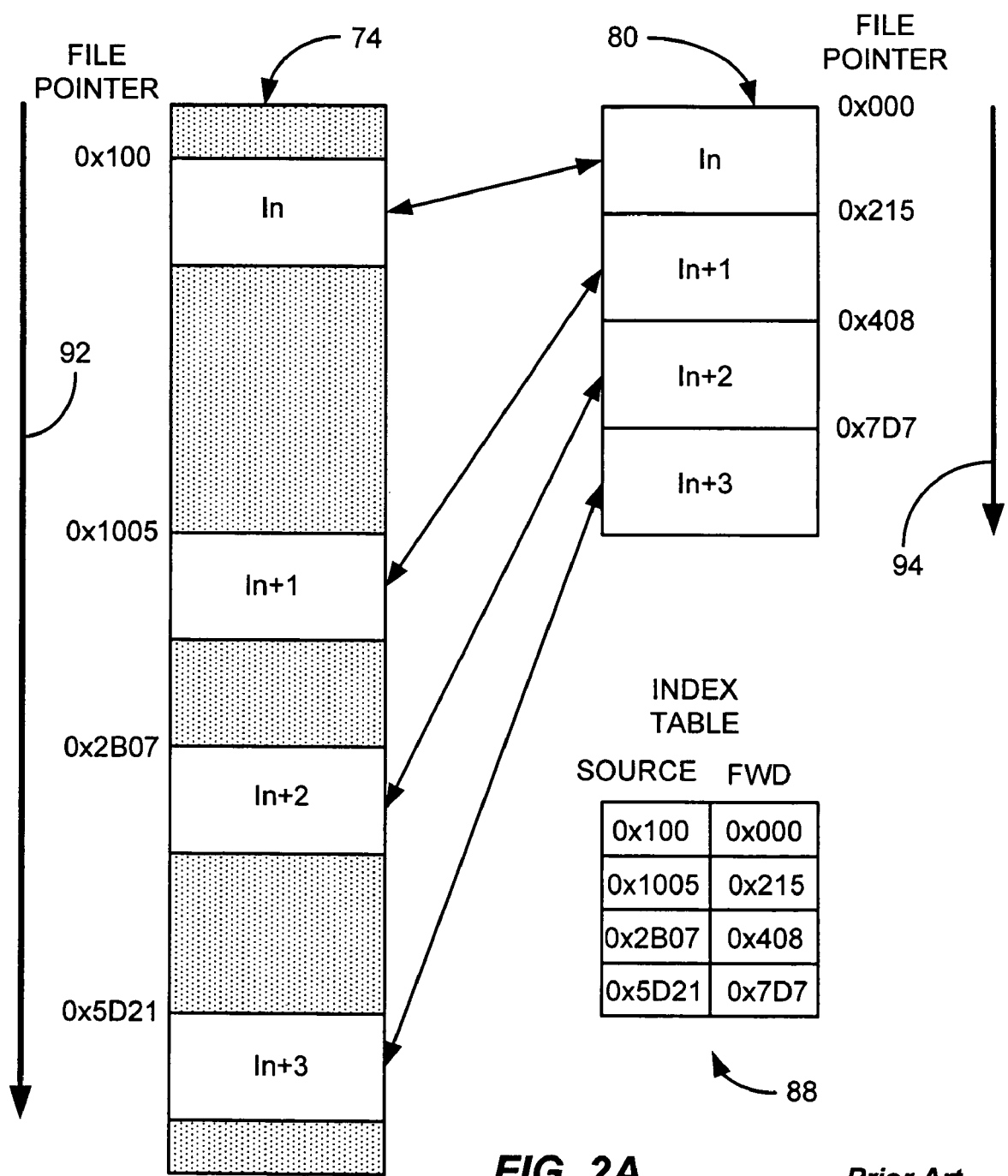
FIG. 2A  *Prior Art*

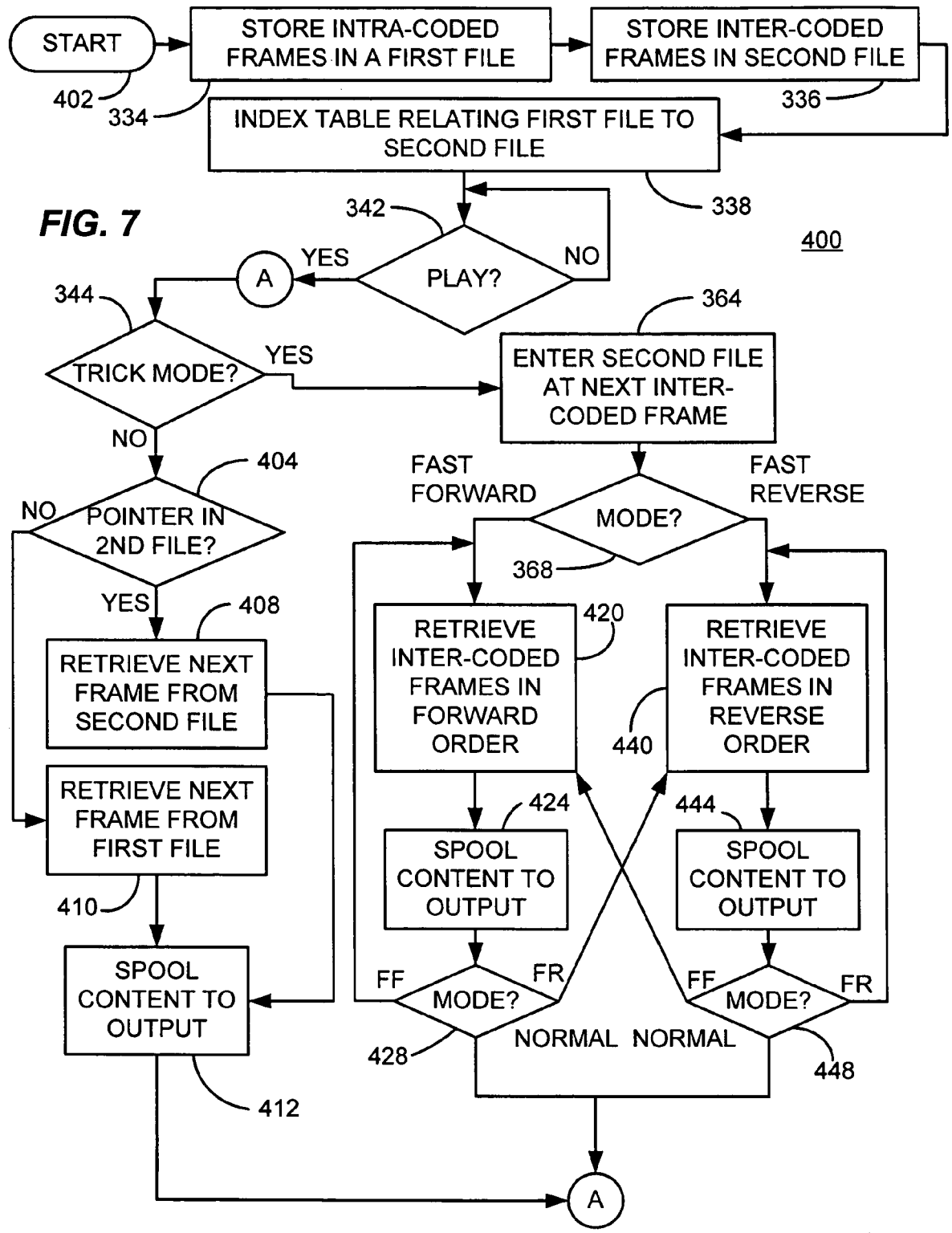

BI-DIRECTIONAL INDICES FOR TRICK MODE VIDEO-ON-DEMAND

CROSS REFERENCE TO RELATED DOCUMENTS

This application is related to and claims priority benefit of U.S. Provisional Patent Application Ser. No. 60/516,157 filed Oct. 31, 2003 to Pedlow et al. for "Bi-Directional Indices for Trick Mode Navigation of Video On Demand Playback" which is hereby incorporated by reference. This application is also related to U.S. Patent Applications entitled "Critical Packet Partial Encryption" to Unger et al., Ser. No. 10/038, 217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; entitled "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The Passage™ initiative (Passage is a trademark of Sony Electronics Inc.), promoted by Sony, provides a mechanism for MSOs (Multiple Service Operators) to deploy non-legacy headend equipment, subscriber devices and services on their existing legacy networks. At present, in the USA, these networks are most commonly supplied by either Motorola (formerly General Instrument) or Scientific Atlanta. These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage™ initiative, the only exit from this situation was to forfeit the considerable capital investment already made with the incumbent provider, due to the intentional incompatibility of equipment between the incumbent and other sources. One primary barrier to interoperability is in the area of conditional access (CA) systems, the heart of addressable subscriber management and revenue collection resources in a modern digital cable network.

The Passage™ technologies were developed to allow the independent coexistence of two or more conditional access systems on a single, common plant. Unlike other attempts to address the issue, the two systems operate with a common transport stream without any direct or indirect interaction between the conditional access systems. Some of the basic processes used in these technologies are discussed in detail in the above-referenced pending patent applications.

The above-referenced commonly owned patent applications, and others, describe inventions relating to various aspects of methods generally referred to herein as partial encryption or selective encryption, consistent with certain aspects of Passage™. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize Set-top boxes (STB) or other implementations of conditional access (CA) receivers (subscriber terminals) from multiple manufacturers in a single system—thus freeing the cable or satellite company to competitively shop for providers of Set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (e.g., shadow PIDs remapped to the primary PID value or vice versa).

One aspect of VOD that has become a "signature" feature is the support of "trick modes". These are operational modes invoked by the session client that mimic a traditional VCR or DVD player and includes fast forward, rewind, pause, suspend (stop), slow motion, etc. Trick modes have been heretofore implemented through the creation of multiple files containing a subset of the original content. The techniques used heretofore in actual cable systems have been wasteful of storage space.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 2A is a diagram illustrating Fast Forward Trick mode storage.

FIG. 7 is another flow chart describing another embodiment of the operation of the system of FIG. 5 in a manner consistent with certain embodiments of the present invention.

ACRONYMS, ABBREVIATIONS AND DEFINITIONS

Figure 1:
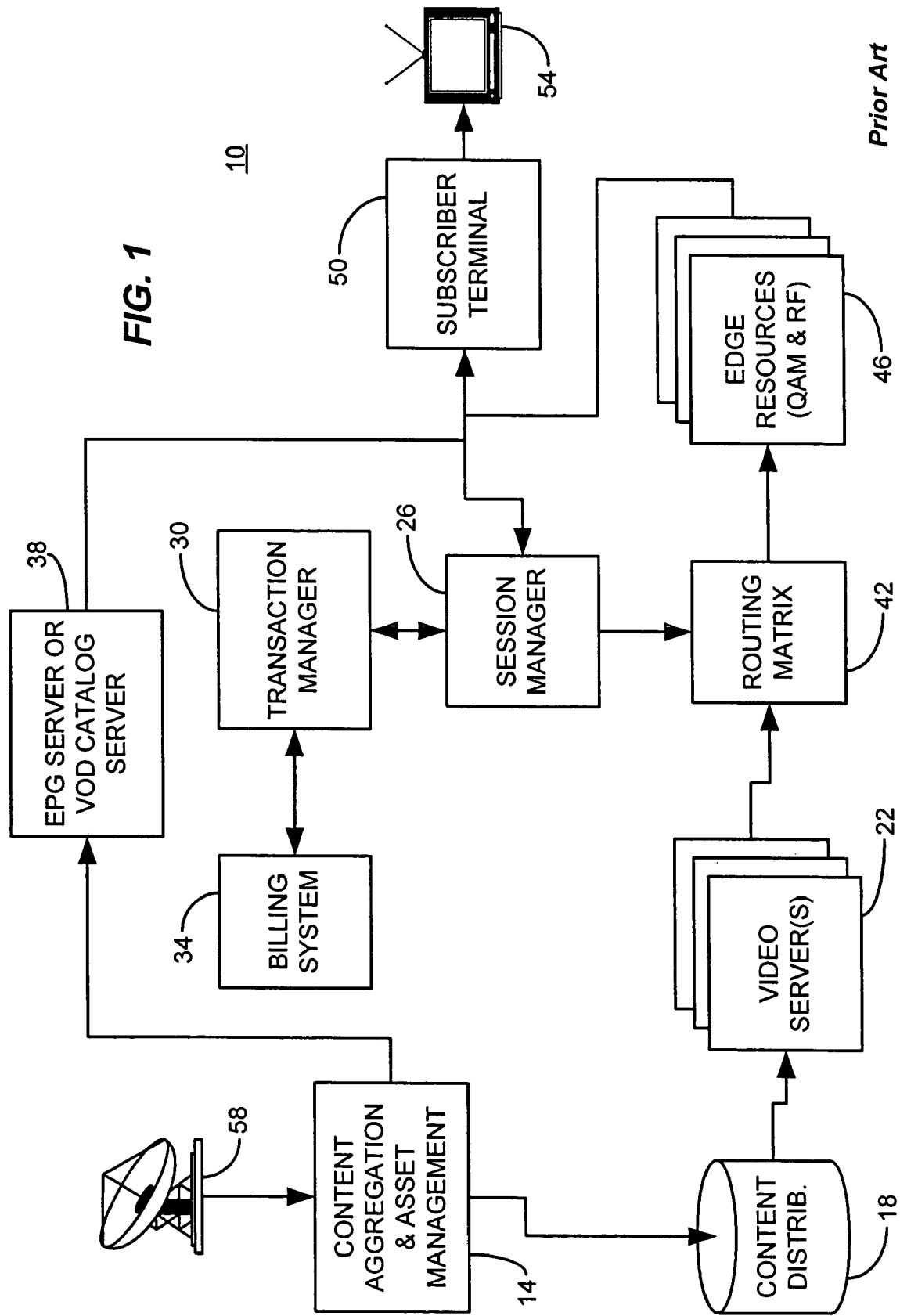
FIG. 1 is a block diagram of a clear video VOD system.

ASI—Asynchronous Serial Interface
CA—Conditional Access
CASID—Conditional Access System Identifier
CPE—Customer Premises Equipment
DHEI—Digital Headend Extended Interface
ECM—Entitlement Control Message
EPG—Electronic Program Guide
GOP—Group of Pictures (MPEG)
MPEG—Moving Pictures Experts Group
MSO—Multiple System Operator
PAT—Program Allocation Table
PID—Packet Identifier
PMT—Program Map Table
PSI—Program Specific Information
QAM—Quadrature Amplitude Modulation
RAM—Random Access Memory
SAN—Storage Area Network
VOD—Video on Demand
Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.
Selective Encryption (or Partial Encryption)—encryption of only a portion of an elementary stream in order to render the stream difficult or impossible to use (i.e., view or hear).
Dual Selective Encryption—encryption of portions of a single selection of content under two separate encryption systems.
Passage™—Trademark of Sony Electronics Inc. for various single and multiple selective encryption systems, devices and processes.
Trick mode—an operational mode of playback of digital content to simulate fast forward, fast reverse (rewind), pause, suspend (stop), slow motion, etc. operations as in a video tape system.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "storing" as used herein means both the act of placing data into a storage medium and holding the data in storage in the storage medium. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of VOD disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

A generalized VOD system 10, as shown in FIG. 1, contains some or all of the following elements/resources: Content Aggregation and Asset management 14, Content distribution (SAN) 18, Video server module(s) 22, Session Management 26, Transaction management 30, Billing system 34, EPG server or VOD catalog server 38, Transport router/switch fabric (routing matrix) 42, Stream encryption device(s) (not shown in this Figure), and QAM modulators/upconverters and other edge resources 46. This VOD system 10 provides programming to the subscriber terminals such as 50 for ultimate viewing and listening on a TV set or other monitor device 54.

In operation, content is received from various sources including, but not limited to, satellite broadcasts received via one or more satellite dishes 58. Content is aggregated at 14 and cataloged at EPG server or VOD catalog server 38. Content is then distributed at 18 to one or more video servers 22. When a subscriber orders a VOD selection, a message is sent from the subscriber terminal (e.g., STB) 50 to the session manager 26. The session manager 26 notifies the transaction manager 30 to assure that the billing system 34 is properly brought into play. The session manager 26 selects a VOD server from a cluster of VOD servers having the requested content on it and having a signal path that reaches the node serving the subscriber. The session manager also enables the routing matrix 42 to properly route the selected video content through the correct edge resources 46 for delivery to the subscriber terminal 50.

For MPEG and similar digital coding schemes, two basic types of frames of video are used: Intra-coded pictures and Inter-coded (or predictive coded) pictures. In MPEG, Intra-coded pictures are commonly referred to as I-pictures or I-frames. Inter-coded pictures in MPEG are further categorized as Predictive coded pictures (P-frames or P-pictures) and Bi-directional coded pictures (B-frames or B-pictures).

Figure 2:
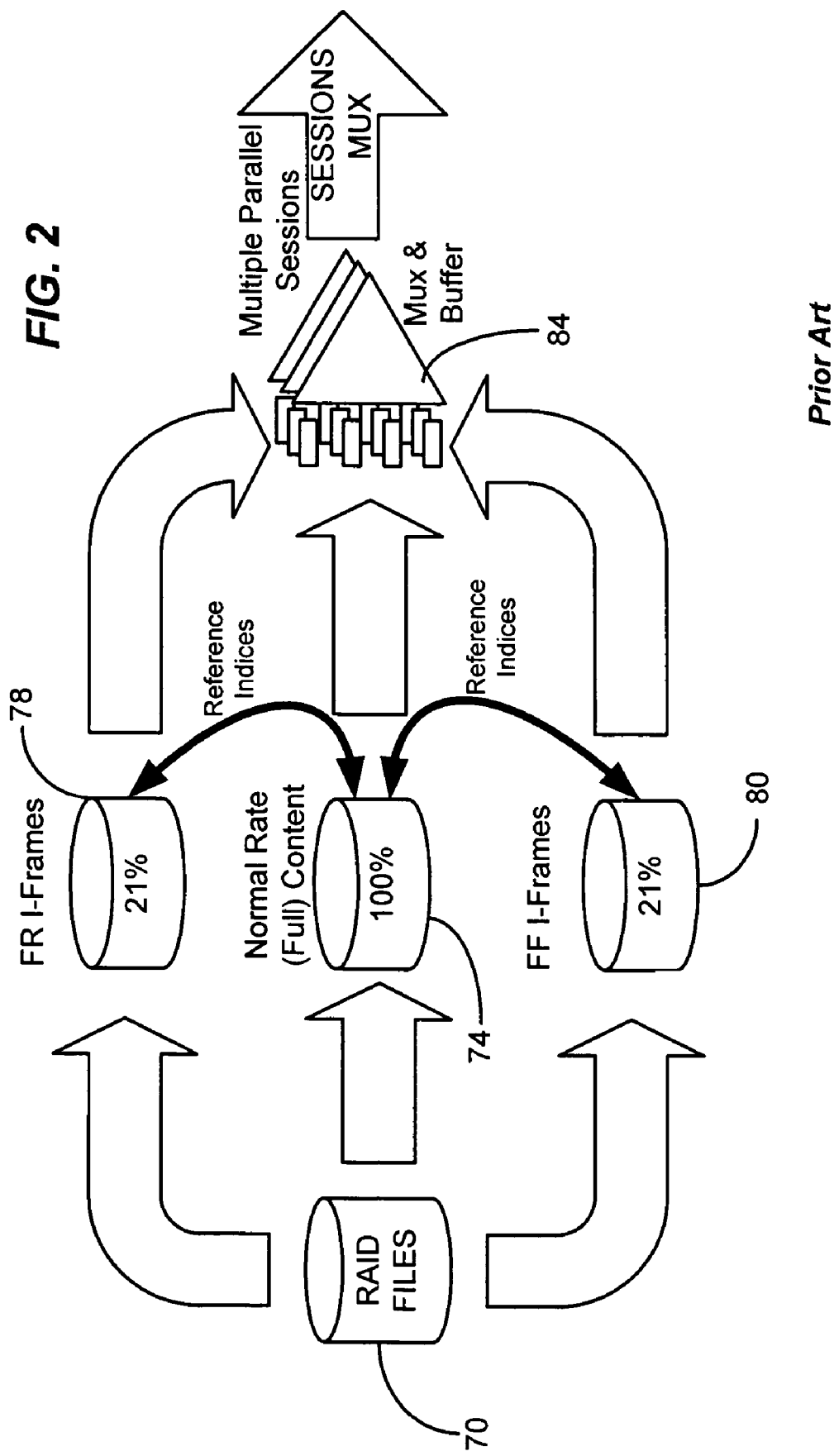
FIG. 2 is a diagram illustrating storage of I-frame data to support trick mode operation in a VOD system.

As previously mentioned, one aspect of VOD that has become a "signature" feature is the support of so-called "trick modes". These are operational modes invoked by the session client that mimic a traditional VCR or DVD player and includes fast forward, fast reverse (rewind), pause, suspend (stop), slow motion, etc. Fast forward and fast reverse (FF and FR) trick modes have been heretofore implemented through the creation of multiple files containing a subset of the original content (subfiles) as illustrated in FIG. 2. The content is generally stored in a set of RAID (Redundant Array of Independent Disks) drives 70. A particular selection of content is stored in its entirety in a file 74 within the RAID drives 70. A set of subfiles for fast reverse and fast forward trick modes (files 78 and 80 respectively) contain I-frames ordered in a manner that will permit sequential playback to achieve the fast reverse (rewind) and fast forward playback effect. That is, file 78 contains I frames in reverse order while file 80 contains I frames in forward order. Typically, these subfiles contain only I-frames, since I-frames contain stand-alone whole pictures (see ISO/IEC 13818-2, section 6.1.1.7). I-frames are somewhat larger than B or P frames, and they typically represent approximately as much as 21% of the data in a given video selection. For purposes of this document, MPEG I-frames and B- or P-frames will be used as examples without limitation, since similar or equivalent frame structures are used for other compressed video formats.

Figure 2B:
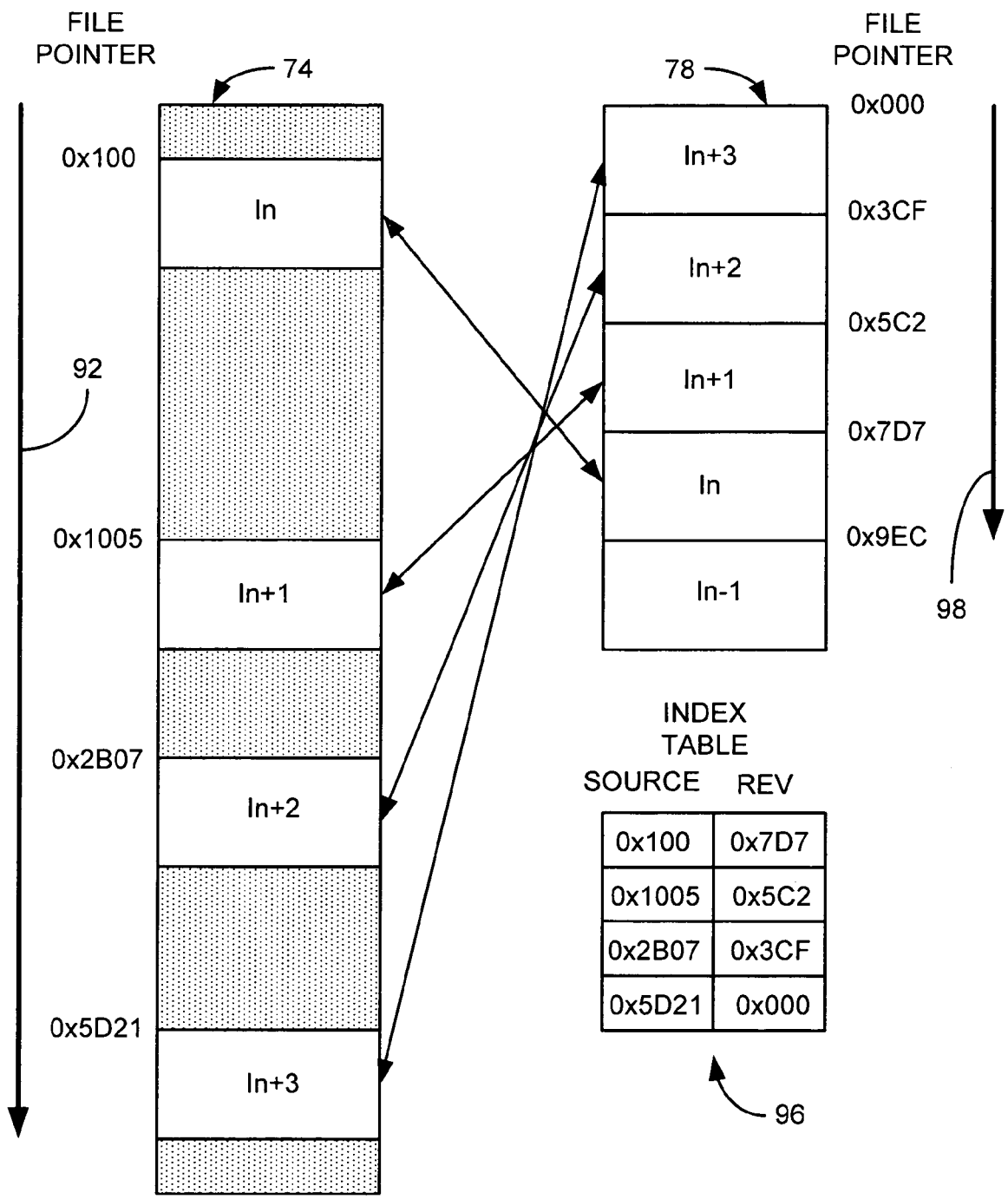
FIG. 2B is a diagram illustrating Fast Reverse Trick mode storage.

FIGS. 2A and 2B further illustrate this arrangement. With reference to FIG. 2A, in order to do Fast Forward trick mode play, the I frames from file 74 are stored in file 80. Index table 88 relates the full content file 74 to FF trick mode file 80 by indexing the file pointers for the I frames in the full content file 74 with corresponding file pointers in file 80. Playback of the file at normal speed is carried out in the direction of arrow 92. Fast Forward trick mode playback is in the direction of arrow 94.

With reference to FIG. 2B, in order to do Fast Reverse trick mode play, the I frames from file 74 are stored in file 78, in this example, in reverse order. Index table 96 relates the full content file 74 to FR trick mode file 78 by indexing the file pointers for the I frames in the full content file 74 with corresponding file pointers in file 78. Playback of the file at normal speed is carried out in the direction of arrow 92. Fast Reverse trick mode playback is in the direction of arrow 98.

A file containing only I-frames extracted from the original content affords the ability to have accelerated playback, since typical GOP (group of pictures) structures have only one frame in about 10 to 20 as an I-frame. If the I-frame files are played at normal rates (1 frame per 33 mS) the pictures will appear to the viewer to sequence at about a 10× to 20×rate, though the actual data rate is the same as the original content. If the I-frame sequence is reversed in the file, the motion will appear to run backwards. This is the method used to implement fast forward and fast-reverse (rewind) trick modes.

By attaching an index count to match the I-frames in the original content file to the duplicated I-frames stored in the associated subfiles 78 and 80 (for FF or FR, respectively), a method is provided to allow immediate transition from normal speed forward play to fast forward or fast reverse (rewind) play. In operation the video server plays the selected content file and upon subscriber selection of a trick mode (or vice versa) the server notes the index value of the closest I-frame and then opens the appropriate associated subfile 78 or 80 and moves to the I-frame in the subfile with the same corresponding index. The video server treats all stream content (main file or subfiles) the same and always spools the MPEG packets to the outgoing transport stream at the same constant bit rate through multiplexers and buffers 84 as shown. It is through this method that trick modes are typically implemented on a slotted, session based system without the encumbrance of additional, dynamic bit rate issues.

A function of the VOD video server(s) 22, in addition to origination of session A/V content, is the creation of the associated, session specific PSI (program specific information). This information is a departure from the broadcast model in that the PSI is extremely dynamic. The content of the PAT and subordinate PMTs change whenever a new session is started or ended. In the broadcast world, the PSI changes very seldom because the PSI tables reflect only the structure of the transport multiplex, not the actual A/V content carried within.

The VOD video server 22 dynamically assigns a new session to an existing, available "slot" in an outgoing transport multiplexed stream. The slot is denoted by the MPEG program number and in many cases, the combination of which transport stream (TSID) and program number determine at the service level a unique session and the routing that occurs as a result. Edge resources 46 generally are not configured dynamically. The routing of content appearing on a particular input port to a specific QAM carrier at the output is determined through a preconfigured, static assignment of TSID/input port and program number mapping to specific QAM resources in the device. This same mapping information is also loaded in the VOD system so that once a session is requested by and authorized for a specific subscriber terminal 50, a solution to a routing matrix 42 can be determined to find the appropriate VOD server 22 and QAM transport 46 serving the requestor. This solution also considers dynamic issues such as which servers 22 the requested asset is loaded upon, and server loading/available slots in addition to the simpler, static solution to finding the first possible path to the requesting subscriber terminal 50.

In addition to solving the routing matrix 42 and provisioning the session with PIDs and PSI appropriate to follow the intended route, elements of the same information (program ID and QAM frequency) are also communicated to the session client at subscriber terminal 50 at the subscriber's premises so that the requested stream can be properly received and presented to the subscriber.

Perhaps the simplest VOD distribution system implementation is a clear VOD distribution system, i.e. one that contains no encryption as depicted in FIG. 1. The system of FIG. 1 is used as an example system, but embodiments of the inventions disclosed herein can also be used with other VOD distribution systems. While not providing any safekeeping of what might be considered the entertainment medium's most valuable properties, namely current feature films, etc., clear VOD avoids many of the issues that the incumbent cable system providers to date have not adequately addressed and that introduction of a second, alternative CA system complicates even further still. Throughout this discussion, it is instructive to carry an example VOD movie through the various embodiments to illustrate the relative storage efficiencies obtained with the various systems disclosed. A real world example of a VOD movie, which will be used throughout this document, has the following attributes:

| | |
|---|---|
| Compressed video data rate: | 3 Mbit/S |
| Movie length: | 120 minutes (2 Hrs) |
| I-frame overhead: | 17% |
| Total storage used for the video portion of a single, clear (unencrypted) copy of a film: | 3.618 GBytes. |

To reduce storage requirements for each movie and to improve system performance, the VOD file architecture shown in FIG. 2 can be modified to remove the second "trick" mode file containing reversed sequence video (used for fast rewind display), as will be described in connection with FIG. 3. Instead, a second set of indices is created pointing to the single, remaining "trick" mode file and containing the same sequence data, but having the indices in reversed sequence for reversed motion. This allows forward or reverse navigation of the single "trick" mode file by simply choosing the appropriate set of playback indices indicating the correct sequence of frames to queue into the playback buffer for output to the client terminal for display. Equivalently, the same set of indices can be used for FF or FR, with the indices sequentially traversed either in the forward or reverse direction respectively.

Figure 3:
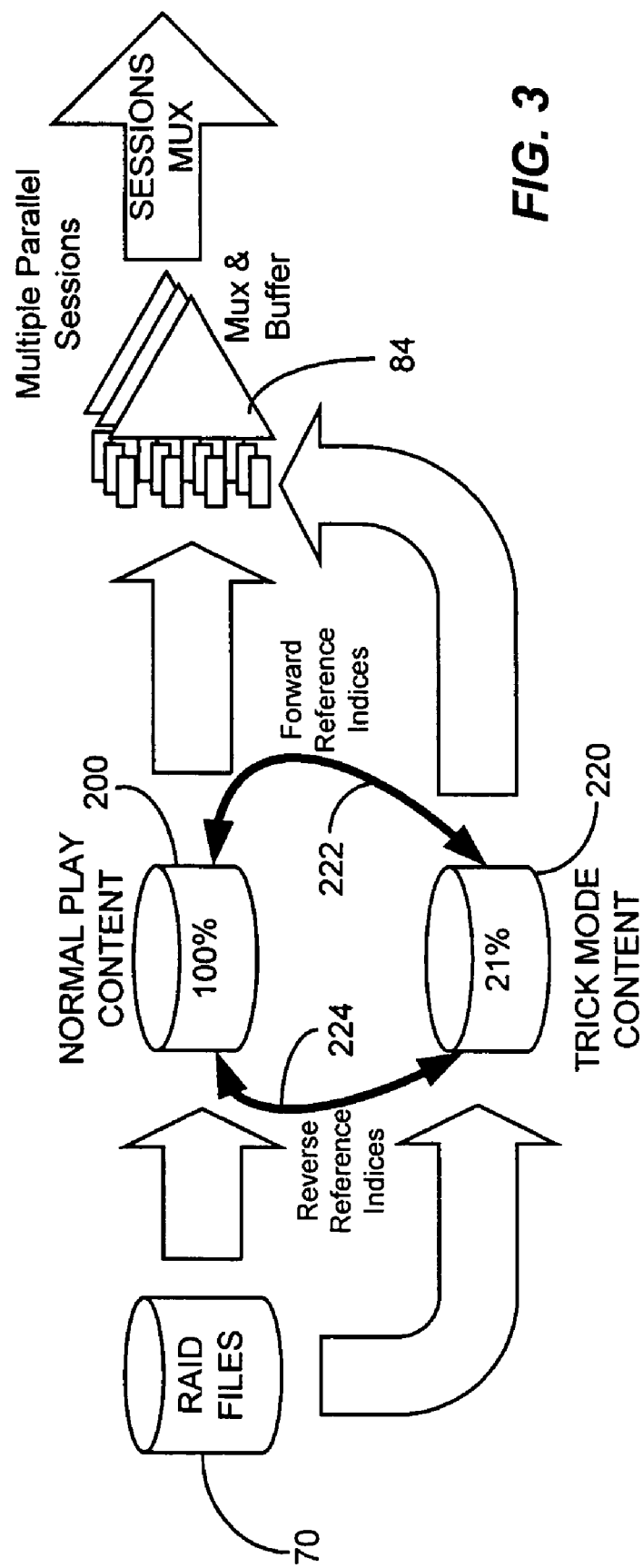
FIG. 3 is a block diagram illustrating a first embodiment of a more storage efficient trick play arrangement consistent with certain embodiments of the present invention.

Referring to FIG. 3, content retrieved from RAID mass storage files 70 is stored at 200 (either encrypted or in the clear). A single set of trick mode content (e.g., I frames in an MPEG encoded selection of content) is stored in a separate file 220. This content may represent as much as approximately 21% of the original file. Thus, by elimination of two such files, by use of forward reference indices 222 and reverse reference indices 224 (or equivalently, a single index table that is traversed either forward or backward), up to approximately 21% of storage space can be saved. In this case, the forward and reverse indices are the same except for their order.

The indices can be visualized as a table such as TABLEs 1 and 2 below. In the case of the using a forward and a reverse index, TABLE 1 represents the forward index and TABLE 2 represents the reverse index.

TABLE 1

(222)

| File pointers in Normal Play File arranged in descending order (forward time order) | File pointers in Trick Play File arranged in descending order (forward time order) |
|---|---|

TABLE 2

(224)

| File pointers in Normal Play File arranged in descending order (forward time order) | File pointers in Trick Play File arranged in ascending order (reverse time order) |
|---|---|

When a subscriber is playing a file in a normal playback mode, data are spooled sequentially from the Normal Play File 200. When a trick play mode of fast forward is initiated, a location in the Trick Mode File 220 is identified by finding the closest file pointer corresponding to the current file pointer in the Normal Play File 200 by reference to TABLE 1. Data are then spooled from the trick play file in the order dictated by the file pointers in TABLE 1.

In a similar manner, when a subscriber is playing a file in a normal playback mode, data are spooled sequentially from the Normal Play File 200. When a trick play mode of fast reverse is initiated, a location in the Trick Mode File 220 is identified by finding the closest file pointer corresponding to the current file pointer in the Normal Play File 200 by reference to TABLE 2. Data are then spooled from the trick play file in the order dictated by the file pointers in TABLE 2.

In either case, when the subscriber returns to normal play mode, the current file index in the Trick Mode File 220 is referenced to a file pointer in the Normal Play File 200 using the appropriate table in order to return to the approximately same location for normal playback. It is noted that slight differences in the locations between the Normal Play file index and the Trick Mode indices will occur since there is not a one-to-one correspondence between the pointers, but the loss of continuity is on the order of a fraction of a second and is generally not noticeable to the viewer.

As noted earlier, a similar result can be achieved with a single set of file indices such as that shown in TABLE 3 (The trick play file pointers could be either ascending or descending.). In this example, fast forward trick play is achieved by playing out the trick play file 220 in the forward direction of the file pointers (top to bottom), and fast reverse trick play is achieved by playing out the trick play file 220 in the reverse direction of the file pointers (bottom to top).

TABLE 3

| File pointers in Normal Play File arranged in descending order | File pointers in Trick Play File arranged in descending order | FF | FR |
|---|---|---|---|

Figure 3A:
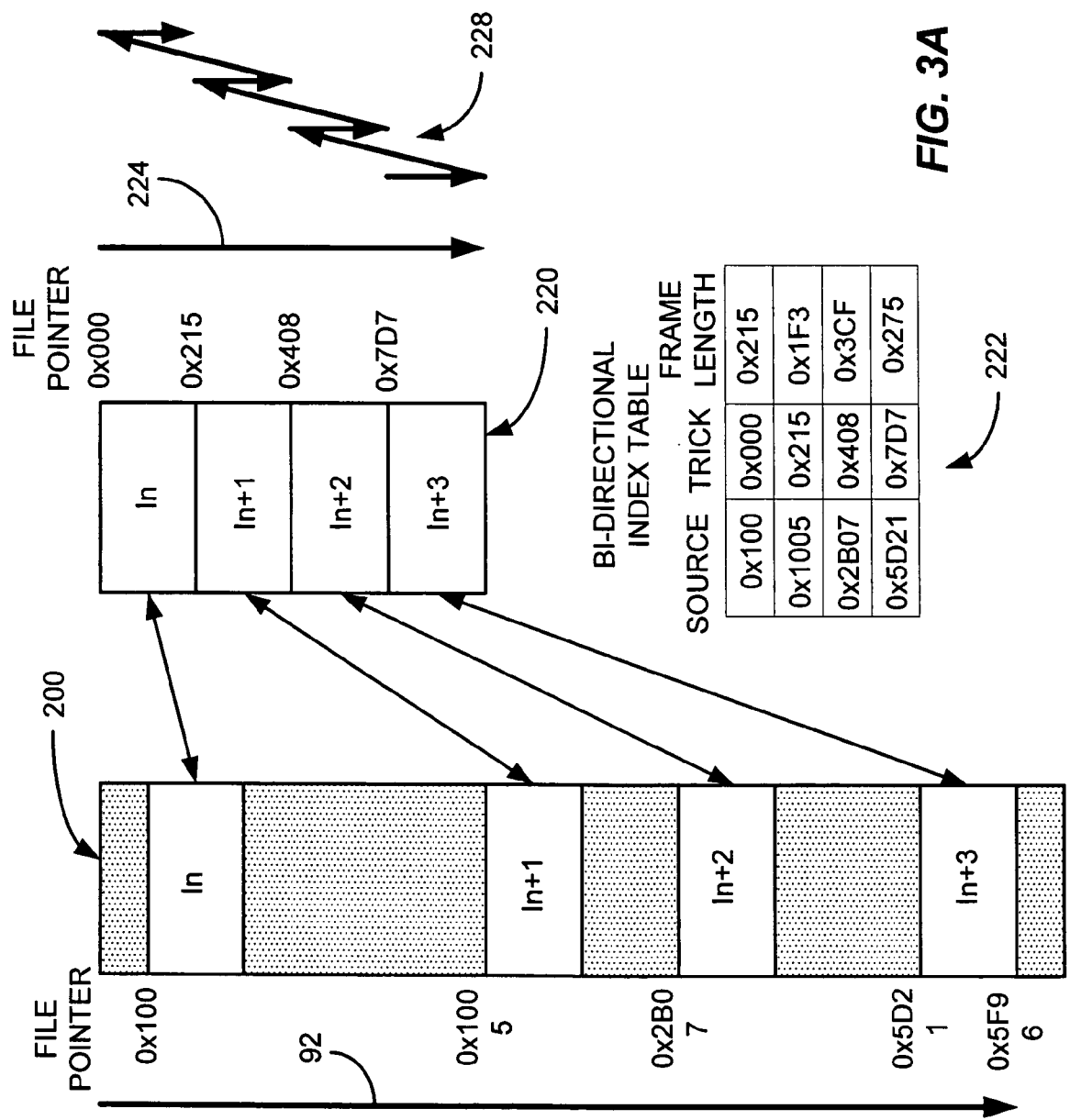
FIG. 3A is a diagram illustrating bi-directional trick mode storage consistent with certain embodiments of the present invention.

With reference to FIG. 3A, in order to do Fast Forward or Fast Reverse trick mode play, the I frames from file 200 are stored in file 220. Index table 222 relates the full content file 200 to trick mode file 220 by indexing the file pointers for the I frames in the full content file 74 with corresponding file pointers in file 220. Additionally, in this exemplary embodiment, the frame length is indexed in order provide the information needed to jump from frame to frame in Fast Reverse trick play mode. Playback of the file at normal speed is carried by playing out the content of file 200 out in the direction of arrow 200. Fast Forward trick mode playback is carried out by playback of file 220 in the direction of arrow 224. In Fast Reverse trick mode, playback is carried out in the directions indicated by arrows 228. Thus, I frame $I_{n+3}$ is played out starting at index 0×7D7 for a duration of 0×275, followed by I frame $I_{n+2}$ played out starting at index 0×408 for a duration of 0×3CF, etc.

Thus, for a single trick mode file and index table Fast Forward trick mode is a linear action in terms of play out of the content of file 220. The process simply jumps to the correlated point in the trick mode file and begins playing out the disk content by monotonically advancing the file pointer. This is not the case for Fast Reverse trick mode. In FR trick mode, the frames are played based upon spoiling the data for a single frame by advancing the file pointer until it gets to a terminal count for the frame. Then the file pointer is reverse jumped back to the preceding frame and frame content is linearly spooled by advancing the file pointer again until the end of the frame as indicated by the frame length entry in table 222.

Figure 4:
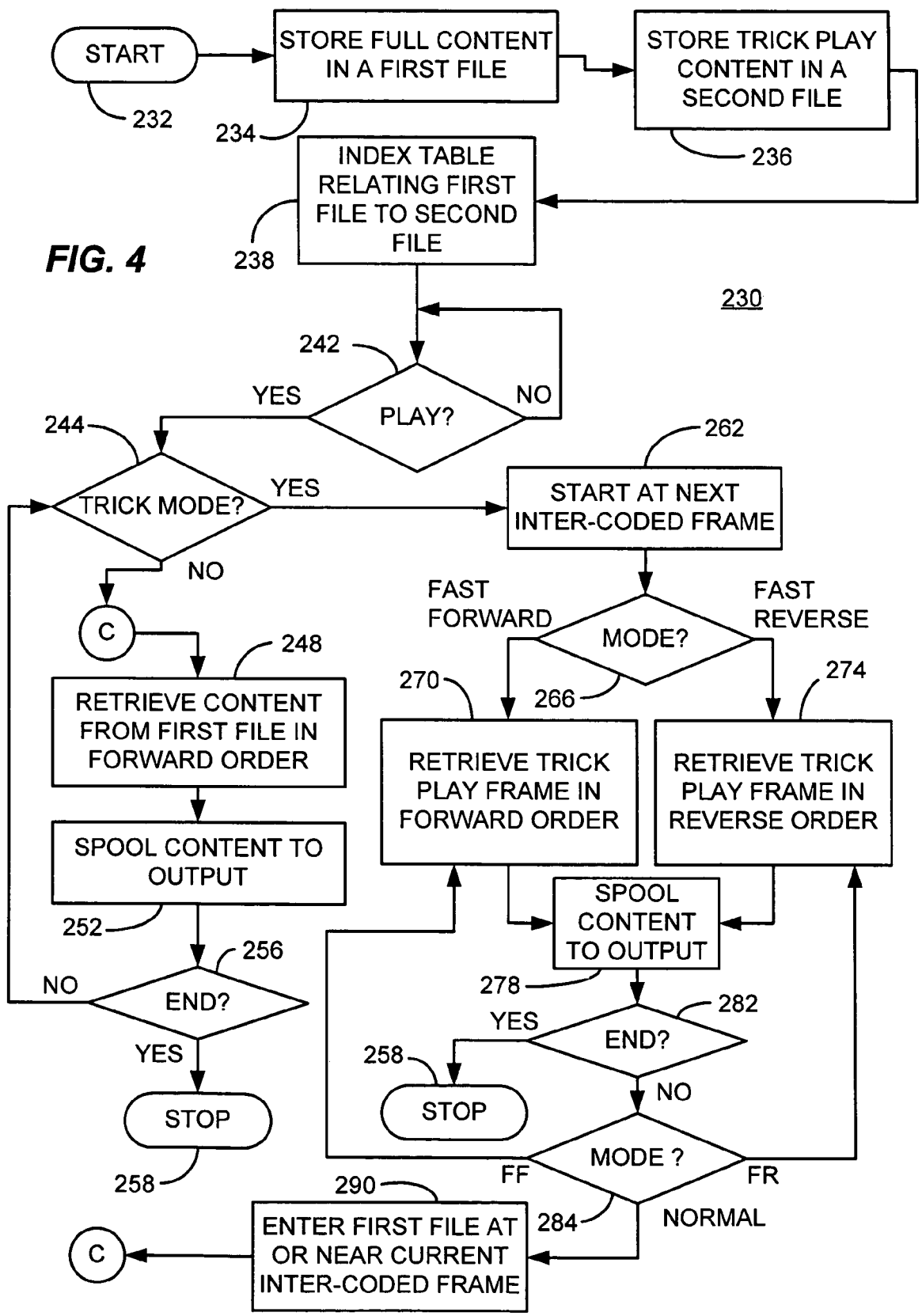
FIG. 4 is a flow chart depicting a process of playing content in a system such as that of FIG. 3 consistent with certain embodiments of the present invention.

One process consistent with certain embodiments is depicted as process 230 of FIG. 4 starting at 232. At 234, the full content is stored in a first file 200 (the main content file used for normal playback). The trick play content is stored in a second file at 236. At 238, an index is created such as that depicted in TABLE 3 that relates the first and second files to one another. When a subscriber issues a valid request for playback at 242, if no trick mode is invoked at 244, the content is retrieved from the first file in forward order at 248 and the content is spooled to an output stream at 252. When the end of the file is reached at 256, the process stops at 258. Otherwise, the process periodically returns to 1244 (e.g., using interrupts or any other suitable program mechanism) to determine if a trick play mode has been invoked by the subscriber.

If a trick play mode is invoked by the subscriber at 244, the index table is referenced to identify a frame of video in the second file (trick play file 220) that is near the current point being played back (for example, the next intra-coded frame in the second file). If, at 266, the trick play mode selected is the Fast Forward (FF) mode, a frame (or group of frames) is retrieved from the second file advancing in the direction representing forward time at 270. This content is then spooled to the output at 278 and if the end of the content is not reached at 282, and the mode (normal, FF or FR) mode of the playback has not changed at 284, control returns to 270 where more data are retrieved, again progressing in the forward time direction through the second file. When the end is reached at 282, the process ends at 258.

If the trick play mode invoked at 266 is fast reverse (FR or Rewind), control passes from 266 to 274 where a frame (or group of frames) is retrieved from the second file advancing in the direction representing reverse time. Control then passes to 278.

If, at 284, the subscriber changes the mode of playback back to normal speed playback, control passes to 290 where the index table is again referenced to identify the location in the first file corresponding the current point of playback from the second file. The first file is then entered at this point and control passes to 248 where normal speed playback proceeds as previously described. Also, if the subscriber changes the mode from FF to FR at 284, control passes to 274, and if the subscriber changes the mode of playback from FR to FF at 284, control passes to 270.

Many variations in this process are possible without departing from certain embodiments consistent with the present invention. For example, the ordering of certain actions can be rearranged without changing the basic operation. Also, equivalently, two tables such as TABLE 1 and TABLE 2 could be used. In this equivalent example, instead of designating an order of retrieval from the second file at 270 and 274, the order is always in the same direction, but with reference to a different table. Also in this variation, the tables used to determine entry points in the files at 262 and 290 depend upon the trick mode selected, thus a mode determination is made at 262 to determine which table to use. Other variations will also occur to those skilled in the art upon consideration of the present teaching.

Thus, a method of storing digital video content to facilitate trick play, the content comprising intra-coded frames of video and inter-coded frames of video, consistent with certain embodiments, involves: storing the inter-coded and the intra-coded frames of the content in a first file; storing a duplicate of the intra-coded frames of the content in a second file; storing a set of forward indices that relates the intra coded frames with the inter-coded frames in a forward direction such that playback of the second file in the order of the forward indices simulates a fast-forward playback; and storing a set of reverse indices that relates the intra-coded frames with the inter-coded frames in a reverse direction such that playback of the second file in the order of the reverse indices simulates a fast-reverse playback.

Another method of storing digital video content to facilitate trick play, the content comprising intra-coded frames of video and inter-coded frames of video, consistent with certain embodiments involves: storing the inter-coded and the intra-coded frames of the content in a first file; storing the intra-coded frames of the content in a second file; storing a set of indices that relate the intra-coded frames in the first file with the intra-coded frames in the second file, such that playback of the second file simulates a fast-forward playback if played back in a first order and simulates a fast rewind if played back in a second order.

Figure 5:
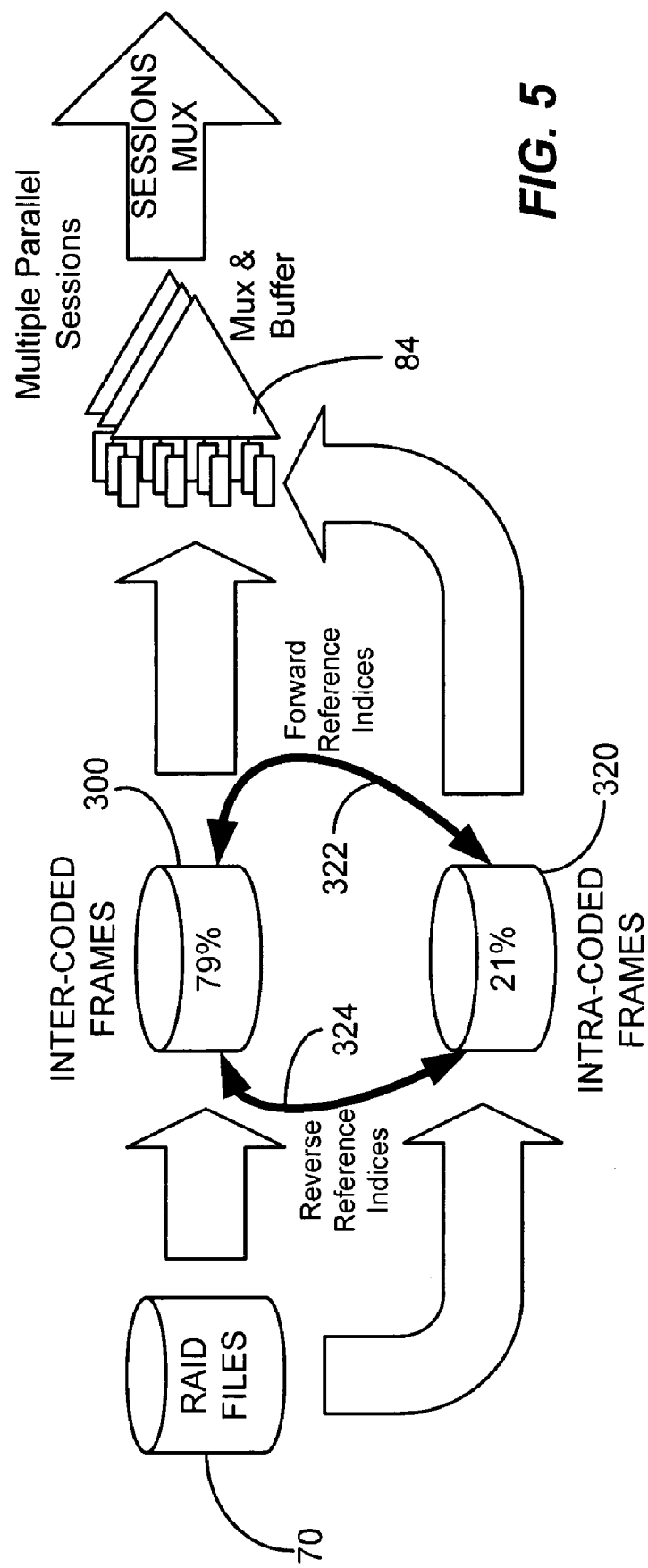
FIG. 5 is a block diagram illustrating an even more storage efficient trick play arrangement consistent with certain embodiments of the present invention.

It is noted that although the arrangement of FIG. 3 provides substantial savings in storage space over the techniques currently in use, additional savings in storage space can be realized by the recognition that the information stored in the trick mode content file 220 is redundant to the I frames stored in the normal play content file 200. By spooling normal play content from both files, an additional savings of up to approximately 21% can be realized as depicted in FIG. 5. In this illustration, all I-frame data (intra-coded data) are stored in the trick mode content file 320, and supplemental normal play content (inter-coded data, B and P frame data) is stored in the normal play content file 300. The bidirectional indices concept is extended for even further storage economy in this embodiment. If one recognizes that the normal mode playback file contains a duplication of the same I-frames played in "trick" modes, a dynamic architecture can be created to remove any redundant I-frame content from the normal mode playback file. During normal playback, the two files are "blended" (normal play and "trick" modes), while only the I-frame sequences in the "trick" mode file are accessed during fast forward, fast reverse (rewind), etc.

As noted above, if one takes the concept described above in connection with FIG. 3 one step further, the current convention in VOD systems to store the same I-frames of a movie in forward and reversed sequence to allow fast forward and rewind "trick" modes can be eliminated. An illustration of this concept is shown in the example of FIG. 5. These dual files for forward and reverse are replaced by a single file 320 of I-frames in normal forward sequence with two sets of indices, one set 322 for playing the I-frame file in forward order and one set 324 for playing the I-frame file in reverse order, or equivalently, by a single index that is traversed in the forward or reverse direction for FF or FR play respectively. The appropriate sets of indices are chosen depending on whether forward or reverse high-speed motion is desired. The forward indices are also used to reconstruct the normal speed stream when matching the I-frame file to the non-critical content file to reconstruct the entire stream. On a clear or re-encrypted VOD system, this will allow up to about 21% storage savings. On a composite pre-encrypted storage system, up to about 42% storage savings may be realized If this additional opportunity is taken, a significant storage economy can be realized over all VOD schemes, including traditional (unencrypted) VOD, as deployed today. The traditional VOD video server has three files for each feature or movie: two containing just I-frames (one in reverse order) and one containing the complete original copy. Research on encoded streams conducted by Sony has shown that the I-frames generally represent approximately 12 to 21% of the total content, typically about 17%. Thus, by using bidirectional indices and dynamic composition, this method removes the redundant I-frames from the clear stream file and an additional (nominal) 17% storage savings is realized over using bidirectional indices alone. This indicates a potential 34% (nominal, 42% maximum) video server disk storage savings for an existing VOD system described in FIG. 2.

As with the example of FIG. 3-3A, either two reference tables or one could be used in implementing various embodiments consistent with this example. In this example, however, it should be remembered that the normal play file does not contain a full set of content, but rather may contain only data associated with intra-coded frames. Thus, to carry out a normal playback, the index tables are used to identify a full set of data and data are pulled from both file 300 and file 320.

The indices can be visualized as a table such as TABLEs 4 and 5 below. In the case of the using a forward and a reverse index, TABLE 4 represents the forward index and TABLE 5 represents the reverse index.

TABLE 4

(322)

| File pointers in Normal Play File arranged in descending order File pointers point to intra-coded data | File pointers in Trick Play File arranged in descending order File pointers point to inter-coded data |
|---|---|

TABLE 5

(324)

| File pointers in Normal Play File arranged in descending order File pointers point to intra-coded data | File pointers in Trick Play File arranged in ascending order File pointers point to inter-coded data |
|---|---|

When a subscriber is playing a file in a normal playback mode, data are spooled sequentially by alternating retrieval of data from the Normal Play File 300 and the Trick Mode File 320. When a trick play mode of fast forward is initiated, a location in the Trick Mode File 320 is identified by finding the closest file pointer corresponding to the current file pointer by reference to TABLE 4. Data are then spooled only from the trick play file in the order dictated by the file pointers in TABLE 4.

In a similar manner, when a subscriber is playing a file in a normal playback mode, data are spooled sequentially from both the Normal Play File 300 and the Trick Mode File 320. When a trick play mode of fast reverse is initiated, a location in the Trick Mode File 320 is identified by finding the closest file pointer to the current playback point by reference to TABLE 5. Data are then spooled from the trick play file in the order dictated by the file pointers in TABLE 5.

In either case, when the subscriber returns to normal play mode, the current file index in the Trick Mode File 320 is used as a starting location for normal play. Data are then pulled from both files 300 and 320 to produce normal playback. It is noted that there is no overlap in the locations between the Normal Play file index and the Trick Mode indices. Playback will generally alternate between playing one or more I frames from file 320 and playing one or more B or P frames from file 300 to construct a complete set of the content.

As noted earlier, a similar result can be achieved with a single set of file indices such as that shown in TABLE 6 (The trick play file pointers could be either ascending or descending.). In this example, fast forward trick play is achieved by playing out the trick play file 320 in the forward direction of the file pointers (top to bottom), and fast reverse trick play is achieved by playing out the trick play file 320 in the reverse direction of the file pointers (bottom to top). Again, normal playback involves selecting data from both files.

TABLE 3

| File pointers in Normal Play File arranged in descending order File pointers point to intracoded data | File pointers in Trick Play File arranged in descending order File pointers point to intercoded data | FF | FR |
|---|---|---|---|
| | | ↓ | ↑ |

Figure 6:
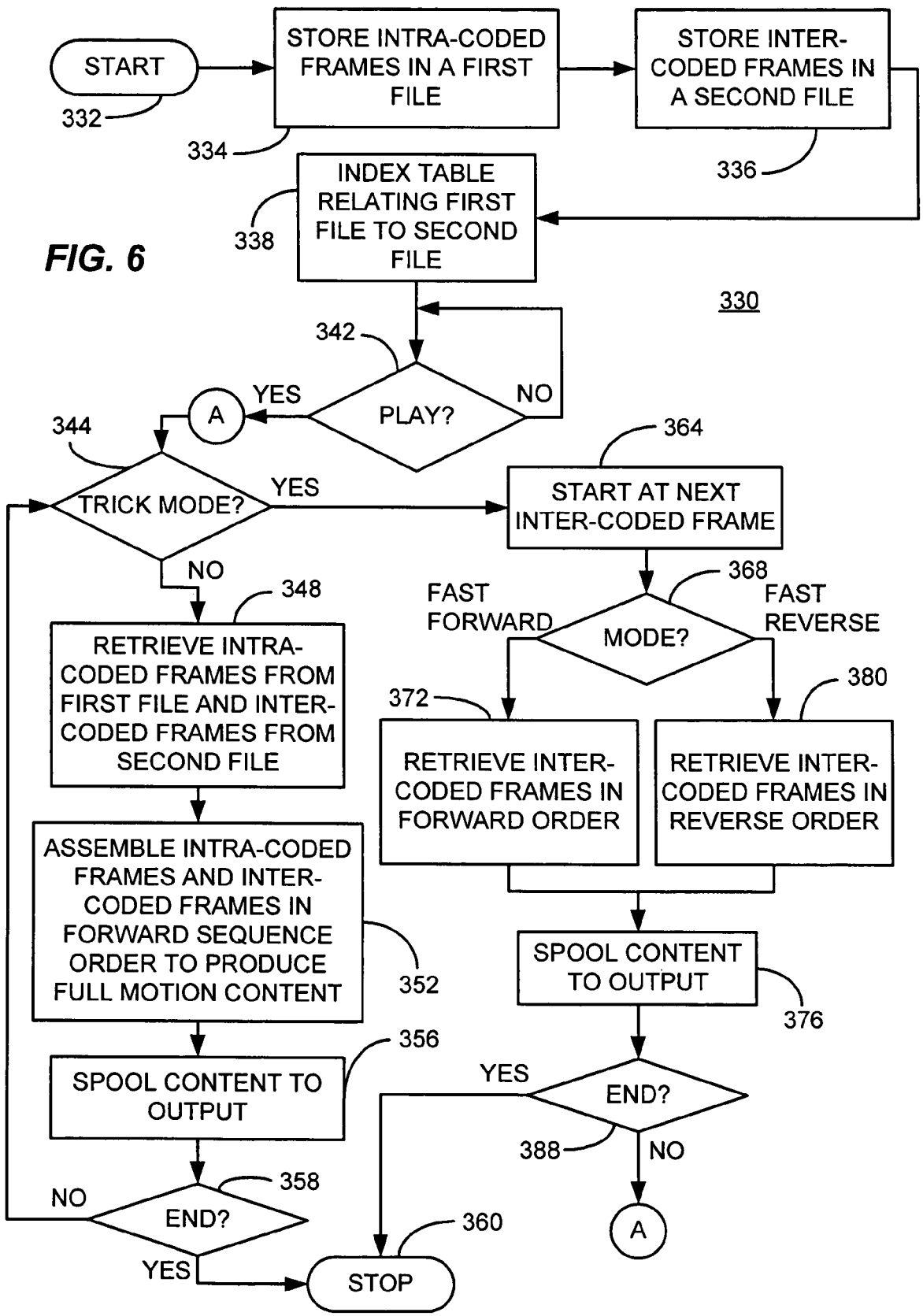
FIG. 6 is a flow chart describing one embodiment of the operation of the system of FIG. 5 in a manner consistent with certain embodiments of the present invention.

A process 330 for playback of content using the arrangement depicted in FIG. 5 is shown in FIG. 6 starting at 332. At 334, intra-coded frames are stored in a first file 320. At 336, inter-coded frames are stored in a second file 300. At 338 one or more index tables are created and stored that relate the first file to the second file. In this example, a single index table is depicted. When a subscriber initiates a playback at 342, a determination of playback mode is made at 344. If a normal playback mode has been invoked at 344, intra-coded frames from the first file and inter-coded frames from the second file are retrieved at 348 and assembled in forward sequence at 352 to produce full motion content. This content is then spooled to the output at 356 until the end is reached at 358 in which case the process stops at 360. If the end is not reached, control returns to 344 on a periodic or frequent basis to determine if a trick mode has been invoked by the subscriber.

If a trick mode has been invoked at 344, a location in the second file is identified, by reference to TABLE 6, that is close to the current point of playback (e.g., the next inter-coded frame) at 364. If a fast forward trick mode has been invoked at 368, control passes to 372 where inter-coded frames are retrieved in forward order from the second file. If fast reverse trick mode has been invoked, control passes from 368 to 380 where inter-coded frames are retrieved in reverse order from the second file. In either case, the retrieved frames are spooled to the output at 376. If the end of the file is reached at 388, the process stops at 360. Otherwise, control passes back to 344 to monitor the state of the selection of trick mode and either continue to operate in trick mode, change from one trick mode to the other or return to normal playback mode.

Many variations in this process are possible without departing from certain embodiments consistent with the present invention. For example, the ordering of certain actions can be rearranged without changing the basic operation. Also, equivalently, two tables such as TABLE 4 and TABLE 5 could be used. In this equivalent example, instead of designating an order of retrieval from the second file at 372 and 380, the order is always in the same direction, but with reference to a different table. Also in this variation, the tables used to determine entry points in the files at 364 and for normal playback depends upon the trick mode selected, thus a mode determination is made at 364 to determine which table to use. Other variations will also occur to those skilled in the art upon consideration of the present teaching.

FIG. 7 shows another embodiment of a playback process similar to that of FIG. 6, but detailing certain variations starting at 402. In this embodiment, processes 334, 336, 338, 342, 344, 364 and 368 can be similar to corresponding processes in process 330. Also, to simplify the diagram, the end of file operation has been omitted, but adding it will be clear to those skilled in the art upon consideration of the present teaching.

In the normal play mode decision from 344, a determination is made as to whether or not the first (or next) frame for playback is located in the second file. If so, the next frame is retrieved from the second file at 408. If not, the next frame is retrieved from the first file at 410. In either event, the retrieved frame is spooled to the output at 412 and control returns to 344 to determine if a mode change has taken place. In other words, the presence or absence of an entry in the second file that corresponds to a next frame in the content is used to determine if content is retrieved from the first file at 410 or the second file at 408.

When a fast forward trick mode is invoked at 368, inter-coded frames are retrieved from the second file in forward order at 420 and the frame is spooled to the output at 424. If no mode change occurs at 428, the process returns to 420 to retrieve the next frame. If the mode changes to normal playback mode at 428, control returns to 344.

If a fast reverse trick mode is invoked at 368, inter-coded frames are retrieved from the second file in reverse order at 440 and the frame is spooled to the output at 444. If no mode change occurs at 448, the process returns to 440 to retrieve the next frame. If the mode changes to normal playback mode at 448, control returns to 344.

If the mode changes to fast reverse at 428, control is passed to 440. If the mode changes to fast forward at 448, control passes to 420.

Again, many variations in this process are possible without departing from certain embodiments consistent with the present invention. For example, the ordering of certain actions can be rearranged without changing the basic operation, and end of file provisions should be provided. Also, equivalently, two tables such as TABLE 4 and TABLE 5 could be used. In this equivalent example, instead of designating an order of retrieval from the second file at 420 and 440, the order is always in the same direction, but with reference to a different table. Also in this variation, the tables used to determine entry points in the files at 364 and for normal playback depends upon the trick mode selected, thus a mode determination is made at 364 to determine which table to use. Other variations including error trapping as well as other considerations will also occur to those skilled in the art upon consideration of the present teaching.

Thus, a method of storing digital video content to facilitate trick play, the content comprising intra-coded frames of video and inter-coded frames of video, consistent with certain embodiments, involves: storing the inter-coded frames of the content in a first file; storing the intra-coded frames of the content in a second file; storing a set of forward indices that relate the intra-coded frames to the inter-coded frames in a forward direction such that playback of the second file in the order of the forward indices simulates a fast-forward playback; and storing a set of reverse indices that relate the intra-coded frames to the inter-coded frames in a reverse direction such that playback of the second file in the order of the reverse indices simulates a fast-reverse playback.

Another method of storing digital video content to facilitate trick play, the content comprising intra-coded frames of video and inter-coded frames of video, consistent with certain embodiments, involves: storing the inter-coded frames of the content in a first file; storing the intra-coded frames of the content in a second file; storing a set of indices that relate the intra-coded frames in the first file with the intra-coded frames in the second file, such that playback of the second file simulates a fast-forward playback if played back in a first order and simulates a fast rewind if played back in a second order.

A video method, consistent with certain embodiments involves retrieving inter-coded video from a first file; retrieving intra-coded video from a second file; and assembling the inter-coded video with the intra-coded video to produce an assembled selection of video content.

If one refers to the example movie scenario described previously, the same movie using 3.618 GB of storage in the clear VOD state would require only 2.700 GBytes to store the same content, still supporting "trick" modes, using bidirectional indices.

The present concepts can also be extended advantageously to a selectively encrypted system. If the "trick" mode subfile and the "critical" data encrypted content can be the same, the content is selectively encrypted at approximately a nominal 17% level (approximately 12% to 21%), much higher than the commonly proposed Passage™ encryption level of approximately 2%, but carrying no inherent storage or system capacity costs, as do other schemes. For this system to work, some changes to the video server software design might be necessary, but these changes would be modifications to the existing processes and would not require substantial new development on the part of the server vendor.

A preprocessor can be used to perform selective encryption of content to be loaded onto the VOD video server 22. A modified file protocol can be used to allow the VOD video server 22 to import and associate these files. Either the preprocessor or the VOD video server 22 can be used to perform the indexing. An alternate instantiation can be used to perform all selective encryption pre-processing within the video server itself. This can be accomplished by modifying the video server application to add a pre-processor task as a separate executable, called by the server during the process to prepare content for pre-encryption.

In accordance with certain embodiments wherein the content is selectively encrypted, "critical packets" are selected for encryption according to a suitable selection criterion associated with the selective encryption process such that they encompass all of the I frames. Thus, the content that is stored as shown in FIG. 3 and FIG. 5 in file 220 or 320 has "critical" packets while content stored in file 300 of FIG. 5 has "non-critical" packets. Content stored in file 200 of FIG. 3 is a mixture of critical and non-critical packets. The "critical" packets selected according to the above-referenced patent applications constitute approximately 2% to 10% of the program (depending upon program content and the selection criteria used to select packets for encryption). A separate copy of the critical content can be maintained for each conditional access system supported by the MSO.

With reference to FIG. 5, when a subscriber session is initiated, the main file 200 containing the normal play content is queued in the video server for playout. In addition, the file containing the trick play packets 220 is also queued for playout. When the program playback is started, the video server reconstructs a single program multiplex in its stream buffer feeding the outgoing transport the correct sequence of packets based upon the indices in the two component files. Although, in general, only about 2-10% of the packets are encrypted in a selective encryption system according to the above pending patent applications, even further security is provided by encryption of all of the I frames in the present embodiment.

The stream files containing "critical" packets may be the same one as the extracted subfile containing all I-frames for "trick" modes, as was described previously. If this opportunity is taken, then a substantial storage economy can be realized over a traditional VOD video server having three files for each feature or movie: two containing just I-frames (one in reverse order) and one containing the complete original copy.

In the example of FIG. 5, the dual files for forward and reverse are replaced by a single file 320 of I-frames in normal forward sequence with two sets of indices, one set 322 for playing the I-frame file in forward order and one set 324 for playing the I-frame file in reverse order. The appropriate sets of indices are chosen depending on whether forward or reverse high-speed motion is desired. The forward indices are also used to reconstruct the normal speed stream when matching the I-frame file to the non-critical content file to reconstruct the entire stream. On a clear or re-encrypted VOD system, this will allow up to about 21% storage savings. On a composite pre-encrypted storage system, up to about 42% storage savings may be realized In accordance with certain embodiments consistent with the present invention, certain of the functional blocks used to implement the VOD system can be implemented using a programmed processor such as a general purpose computer. One example of such a functional block is the session manager 26. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Thus, in one example, a computer readable storage device for storage and retrieval of digital video content, consistent with certain embodiments has a computer readable storage device. A first file resides on the storage device for storing inter-coded frames of the digital video content. A second file resides on the storage device for storing intra-coded frames of the digital video content. An index table is also stored on the storage device that relates the intra-coded frames in the first file with the intra-coded frames in the second file, such that playback of the second file simulates a fast-forward playback if played back in a first order and simulates a fast rewind if played back in a second order.

In another example, a computer readable storage device for storage and retrieval of digital video content, consistent with certain embodiments, has a computer readable storage device. A first file resides on the storage device storing inter-coded frames of the digital video content. A second file residing on the storage device storing intra-coded frames of the digital video content in a second file. A forward index table residing on the storage device that relates the intra-coded frames to the inter-coded frames in a forward direction such that playback of the second file in the order of the forward indices simulates a fast-forward playback. A reverse index table residing on the storage device that relates the intra-coded frames to the inter-coded frames in a reverse direction such that playback of the second file in the order of the reverse indices simulates a fast-reverse playback.

While certain illustrative embodiments have been described, it is evident that many alternatives, modifications, permutations and variations will become apparent to those skilled in the art in light of the foregoing description.

What is claimed is:

1. A method of storing digital video content to facilitate trick play, the content comprising intra-coded frames of video and inter-coded frames of video, the method comprising:
    storing the inter-coded and the intra-coded frames of the content in a first file;
    storing only a duplicate of the intra-coded frames of the content in a second file;
    storing a set of forward indices that relates the intra coded frames with the inter-coded frames in a forward direction such that playback of the second file in the order of the forward indices simulates a fast-forward playback; and
    storing a set of reverse indices that relates the intra-coded frames with the inter-coded frames in a reverse direction such that playback of the second file in the order of the reverse indices simulates a fast-reverse playback.

2. The method according to claim 1, further comprising generating the set of forward indices and the set of reverse indices for storage.

3. The method according to claim 1, wherein the digital video content is MPEG encoded, wherein the intra-coded frames comprise I-frames, and wherein the inter-coded frames comprise P-frames and B-frames.

4. The method according to claim 1, further comprising retrieving the inter-coded and the intra-coded frames from the first file to produce a normal playback stream.

5. The method according to claim 4, further comprising retrieving the intra-coded frames from the second file in the order of the forward indices to produce a fast forward playback stream, and wherein the retrieving of intra-coded frames from the second file starts at a frame near a current playback point in the normal playback stream, and wherein the frame near the current playback point is determined from the forward indices.

6. The method according to claim 1, further comprising retrieving the intra-coded frames from the second file in the order of the forward indices to produce a fast forward playback stream.

7. The method according to claim 6, further comprising retrieving the inter-coded and intra-coded frames from the first file in the order of the forward indices to produce a normal playback stream, and wherein the retrieving of inter-coded and intra-coded frames from the first file starts at a frame near a current playback point in the fast forward playback stream, and wherein the frame near the current playback point is determined from the forward indices.

8. The method according to claim 1, further comprising retrieving the intra-coded frames from the second file in the order of the reverse indices to produce a fast reverse playback stream.

9. The method according to claim 8, further comprising retrieving the inter-coded and intra-coded frames from the first file in the order of the forward indices to produce a normal playback stream, and wherein the retrieving of inter-coded and intra-coded frames from the first file starts at a frame near a current playback point in the fast reverse playback stream, and wherein the frame near the current playback point is determined from the reverse indices.

10. A method of storing digital video content to facilitate trick play, the content comprising intra-coded frames of video and inter-coded frames of video, the method comprising:
storing the inter-coded and the intra-coded frames of the content in a first file;
storing only a duplicate of the intra-coded frames of the content in a second file;
storing a set of indices that relate the intra-coded frames in the first file with the intra-coded frames in the second file, such that playback of the second file simulates a fast-forward playback if played back in a first order and simulates a fast rewind if played back in a second order.

11. The method according to claim 10, further comprising generating the set of indices for storage.

12. The method according to claim 10, wherein the digital video content is MPEG encoded, wherein the intra-coded frames comprise I-frames, and wherein the inter-coded frames comprise P-frames and B-frames.

13. The method according to claim 10, further comprising retrieving the inter-coded and the intra-coded frames from the first file to produce a normal playback stream.

14. The method according to claim 13, further comprising retrieving the intra-coded frames from the second file in a first order of the indices to produce a fast forward playback stream, and wherein the retrieving of intra-coded frames from the second file starts at a frame near a current playback point in the normal playback stream, and wherein the frame near the current playback point is determined from the indices.

15. The method according to claim 10, further comprising retrieving the intra-coded frames from the second file in a first order of the indices to produce a fast forward playback stream.

16. The method according to claim 15, further comprising retrieving the inter-coded and intra-coded frames from the first file to produce a normal playback stream, and wherein the retrieving of inter-coded and intra-coded frames from the first file starts at a frame near a current playback point in the fast forward playback stream, and wherein the frame near the current playback point is determined from the indices.

17. The method according to claim 10, further comprising retrieving the intra-coded frames from the second file in a second order of the indices to produce a fast reverse playback stream.

18. The method according to claim 17, further comprising retrieving the inter-coded and intra-coded frames from the first file to produce a normal playback stream, and wherein the retrieving of inter-coded and intra-coded frames from the first file starts at a frame near a current playback point in the fast reverse playback stream, and wherein the frame near the current playback point is determined from the indices.

19. A method of storing digital video content to facilitate trick play, the content comprising intra-coded frames of video and inter-coded frames of video, the method comprising:
at a video on demand system for a television service provider:
storing the inter-coded frames and intra-coded frames of the content in a first file;
storing only a duplicate of the intra-coded frames of the content in a second file;
storing a set of forward indices that relate the intra-coded frames to the inter-coded frames in a forward direction such that playback of the second file in the order of the forward indices simulates a fast-forward playback;
storing a set of reverse indices that relate the intra-coded frames to the inter-coded frames in a reverse direction such that playback of the second file in the order of the reverse indices simulates a fast-reverse playback, and
where, commands received at the television service provider from a subscriber terminal requesting trick play modes are implemented by retrieving inter-coded frames from the first file using either the forward or the reverse indices.

20. The method according to claim 19, further comprising generating the set of forward indices and the set of reverse indices for storage.

21. The method according to claim 19, wherein the digital video content is MPEG encoded, wherein the intra-coded frames comprise I-frames, and wherein the inter-coded frames comprise P-frames and B-frames.

22. The method according to claim 19, further comprising retrieving the intra-coded frames and inter-coded frames from the first file to produce a normal playback stream.

23. The method according to claim 22, further comprising retrieving the intra-coded frames from the second file in the order of the forward indices to produce a fast forward playback stream, and wherein the retrieving of intra-coded frames from the second file starts at a frame near a current playback point in the normal playback stream, and wherein the frame near the current playback point is determined from the forward indices.

24. The method according to claim 19, further comprising retrieving the intra-coded frames from the second file in the order of the forward indices to produce a fast forward playback stream.

25. The method according to claim 24, further comprising retrieving the intra-coded frames and the inter-coded frames from the first file in the order of the forward indices to produce a normal playback stream, and wherein the retrieving of the inter-coded frames from the first file starts at a frame near a current playback point in the fast forward playback stream, and wherein the frame near the current playback point is determined from the forward indices.

26. The method according to claim 19, further comprising retrieving the intra-coded frames from the second file in the order of the reverse indices to produce a fast reverse playback stream.

27. The method according to claim 26, further comprising retrieving the intra-coded frames and the inter-coded frames from the first file in the order of the forward indices to produce a normal playback stream, and wherein the retrieving of intra-coded frames and the inter-coded frames from the first file starts at a frame near a current playback point in the fast reverse playback stream, and wherein the frame near the current playback point is determined from the reverse indices.

28. A tangible non-transitory computer readable storage device for storage and retrieval of digital video content, comprising:
at least one computer readable storage medium for use in conjunction with at a video on demand system for a television service provider;

a first file residing on the storage medium storing intra-coded and inter-coded frames of the digital video content;

a second file residing on the storage medium storing only duplicates of the intra-coded frames of the digital video content in a second file;

a forward index table residing on the storage medium that relates the intra-coded frames to the inter-coded frames in a forward direction such that playback of the second file in the order of the forward indices simulates a fast-forward playback;

a reverse index table residing on the storage medium that relates the intra-coded frames to the inter-coded frames in a reverse direction such that playback of the second file in the order of the reverse indices simulates a fast-reverse playback, and where, commands received at the television service provider from a subscriber terminal requesting trick play modes are implemented by retrieving intra-coded frames from the second file using either the forward or the reverse indices.

* * * * *